(12) United States Patent
Shimoda et al.

(10) Patent No.: US 11,255,464 B2
(45) Date of Patent: Feb. 22, 2022

(54) LOW NOISE GATE VALVE

(71) Applicant: SMC Corporation, Chiyoda-ku (JP)

(72) Inventors: Hiromi Shimoda, Noda (JP); Hiroshi Ogawa, Okegawa (JP); Hiroshi Udagawa, Soka (JP); Takashi Nagao, Abiko (JP)

(73) Assignee: SMC Corporation, Chiyoda-ku (JP)

( * ) Notice: Subject to any disclaimer, the term of this patent is extended or adjusted under 35 U.S.C. 154(b) by 122 days.

(21) Appl. No.: 16/724,741

(22) Filed: Dec. 23, 2019

(65) Prior Publication Data

US 2020/0208755 A1    Jul. 2, 2020

(30) Foreign Application Priority Data

Dec. 28, 2018  (JP) .............................. JP2018-247496

(51) Int. Cl.
*F16K 47/02* (2006.01)
*F16K 31/122* (2006.01)
*F16K 3/02* (2006.01)

(52) U.S. Cl.
CPC ............ *F16K 47/02* (2013.01); *F16K 3/0281* (2013.01); *F16K 31/1221* (2013.01); *F16K 31/1225* (2013.01)

(58) Field of Classification Search
CPC ............... F16K 3/0281; F16K 31/1221; F16K 31/1225; F16K 47/02; F16K 47/023; F16K 47/00

(Continued)

(56) References Cited

U.S. PATENT DOCUMENTS 3,835,753 A * 9/1974 Bunyard ................. F01B 11/02
                                                92/85 R
5,193,433 A   3/1993 Reimer
(Continued)

FOREIGN PATENT DOCUMENTS

JP          51-9157 U      1/1976
JP          58-152907 A    9/1983
(Continued)

OTHER PUBLICATIONS

Japanese Notification of Reason for Refusal dated Dec. 3, 2019, in Patent Application No. 2018-247496, 14 pages (with English translation).

*Primary Examiner* — Kevin F Murphy
*Assistant Examiner* — Jonathan J Waddy
(74) *Attorney, Agent, or Firm* — Oblon, McClelland, Maier & Neustadt, L.L.P.

(57) ABSTRACT

A pair of air cylinders that cause a valve plate to perform an opening/closing operation each include a head-side air cushion mechanism and a rod-side air cushion mechanism. Each head-side air cushion mechanism includes a head-side communication path and a head-side restricting flow path that connect a head-side pressure chamber and a head-side main flow path in parallel, and a blocking mechanism that blocks the head-side communication path when a piston approaches a retreat stroke end, and each rod-side air cushion mechanism includes a rod-side communication path and a rod-side restricting flow path that connect a rod-side pressure chamber and a rod-side main flow path in parallel, and a blocking mechanism that blocks the rod-side communication path when the piston approaches an advance stroke end.

6 Claims, 14 Drawing Sheets

(58) Field of Classification Search
USPC .............................................. 92/85 B, 85 R
See application file for complete search history.

(56) References Cited

U.S. PATENT DOCUMENTS

| | | | | |
|---|---|---|---|---|
| 5,975,492 A | * | 11/1999 | Brenes | F16K 3/0254 251/175 |
| 7,066,443 B2 | * | 6/2006 | Ishigaki | F16K 51/02 251/195 |
| 2015/0014556 A1 | * | 1/2015 | Ishigaki | F16K 51/02 251/12 |

FOREIGN PATENT DOCUMENTS

| | | | |
|---|---|---|---|
| JP | 4-505797 A | | 10/1992 |
| JP | 2015215009 A | * | 12/2015 |

\* cited by examiner

LOW NOISE GATE VALVE

TECHNICAL FIELD

The present invention relates to a gate valve that is mounted on a vacuum chamber in a semiconductor processing device and that is used to open and close a gate opening that communicates with the vacuum chamber, and, more specifically, to a low noise gate valve producing little noise when opening and closing the gate opening.

BACKGROUND ART

In a semiconductor processing device, a gate valve such as the gate valve disclosed in Patent Literature 1 is used in opening and closing a gate opening that communicates with a vacuum chamber. The gate valve includes a valve plate that opens and closes the gate opening, a valve shaft that is connected to the valve plate, and a pair of air cylinders that cause the valve plate to perform opening/closing operations via the valve shaft. The gate valve opens and closes the gate by the valve plate by moving the valve plate upward and downward via the valve shaft by the pair of air cylinders.

More specifically, by moving the pistons of the pair of air cylinders forward and rearward, the valve plate is moved to a fully opened position, an intermediate position, and a hermetically sealed position via the valve shaft. The fully opened position is where the valve plate has moved downward and the gate opening is fully opened. The intermediate position is where the valve plate has moved upward and the gate opening is not closed though the valve plate faces the gate opening. The hermetically sealed position is where the valve plate has moved to a gate opening side and the gate opening is closed.

In the publically known gate valve, when the valve plate is at the fully opened position, each piston exists at an advance stroke end and contacts one of end walls of a cylinder housing, and when the valve plate is at the hermetically sealed position, each piston is at a retreat stroke end and contacts the other end wall of the cylinder housing. Therefore, each time the valve plate repeats the opening/closing operations, each piston collides with the end wall at the advance stroke end and the end wall at the retreat stroke end, as a result of which a problem that a collision noise is generated occurs.

Therefore, in order to realize an operating environment producing little noise as a result of reducing a collision noised produced by each piston, there is a desire for a new gate valve including a structure in which the collision noise is unlikely to be generated.

CITATION LIST

Patent Literature

[PTL 1] Japanese Unexamined Patent Application Publication No. 2015-215009

SUMMARY OF INVENTION

Technical Problem

An object of the present invention is to provide a gate valve having a reasonably designed structure in which, when a gate opening is opened and closed by a valve plate, a collision noise that is produced when pistons of air cylinders collide with stroke ends can be effectively reduced by making use of an air-cushioning effect.

Solution to Problem

To this end, a low noise gate valve of the present invention includes a valve plate that opens and closes a gate opening, a valve shaft whose distal end is connected to the valve plate, and a driving mechanism that causes the valve plate to perform an opening/closing operation via the valve shaft.

The driving mechanism includes a hood through which the valve shaft displace ably extends, a pair of left and right air cylinders that are mounted on the hood parallel to each other with the valve shaft interposed therebetween, and a head-side port and a rod-side port that allow air to be supplied to and discharged from the pair of air cylinders; and each air cylinder includes a cylinder housing that is fixed to the hood, a piston that is accommodated in the cylinder housing so as to advance and retreat freely, a driving rod whose proximal end is connected to the piston and whose distal end protrudes out from the cylinder housing, and a head-side pressure chamber and a rod-side pressure chamber that are formed on one end side and the other end side of the piston.

The head-side pressure chambers communicate with the head-side port via head-side main flow paths formed at the cylinder housings and the hood, and the rod-side pressure chambers communicate with the rod-side port via rod-side main flow paths formed at the cylinder housings and the hood; and a proximal end portion of the valve shaft is supported by the driving rods of the pair of air cylinders via a shaft supporting mechanism, the valve plate moves to a position where the gate opening is opened due to an advance stroke of the pistons and the driving rods, and the valve plate moves to a position where the valve plate closes the gate opening due to a retreat stroke of the pistons and the driving rods.

Each air cylinder includes a head-side air cushion mechanism and a rod-side air cushion mechanism that reduce shock when the gate opening is opened and closed by the valve plate; each head-side air cushion mechanism includes a head-side communication path and a head-side restricting flow path that connect the head-side pressure chamber and the head-side main flow path in parallel, and a blocking mechanism that blocks the head-side communication path when the piston that retreats has approached a retreat stroke end; and each rod-side air cushion mechanism includes a rod-side communication path and a rod-side restricting flow path that connect the rod-side pressure chamber and the rod-side main flow path in parallel, and a blocking mechanism that blocks the rod-side communication path when the piston that advances has approached an advance stroke end.

In the present invention, the blocking mechanism of each head-side air cushion mechanism may include a head-side cushion shaft that protrudes into the head-side pressure chamber from an end wall of the head-side pressure chamber, a concave-shaped head-side cushion hole that is formed in the piston so that the head-side cushion shaft is fitted thereto when the piston has approached the retreat stroke end, and a head-side cushion packing that seals a portion between an inner periphery of the head-side cushion hole and an outer periphery of the head-side cushion shaft, and the head-side communication path is formed in the head-side cushion shaft; and the blocking mechanism of each rod-side air cushion mechanism may include a concave-shaped rod-side cushion hole that is formed in an end wall of the rod-side pressure chamber, a rod-side cushion shaft that is fitted in the rod-side cushion hole when the piston has approached the advance stroke end, and a rod-side cushion packing that seals a portion between an inner periphery of the rod-side cushion hole and an outer periphery of the rod-side cushion shaft; and the rod-side communication path may be formed from the rod-side cushion hole.

In this case, it is desirable that each head-side cushion packing be formed so as to block a flow of air flowing towards the head-side cushion hole from the head-side pressure chamber and allow a flow of air flowing towards the head-side pressure chamber from the head-side cushion hole, and each rod-side cushion packing be formed so as to block a flow of air flowing towards the rod-side cushion hole from the rod-side pressure chamber and allow a flow of air flowing towards the rod-side pressure chamber from the rod-side cushion hole.

In the present invention, wherein all of the head-side communication paths and the head-side restricting flow paths of the head-side air cushion mechanisms of the pair of air cylinders communicate with the head-side main flow paths, and all of the rod-side communication paths and the rod-side restricting flow paths of the rod-side air cushion mechanisms of the pair of air cylinders communicate with the rod-side main flow paths, so that the head-side air cushion mechanisms and the rod-side air cushion mechanisms of the pair of air cylinders operate in synchronism with each other.

Further, in the present invention, it is desirable that each piston and the valve plate include a fully opened position, where the valve plate fully opens the gate opening, an intermediate position, where the valve plate does not close the gate opening though the valve plate faces the gate opening, and a hermetically sealed position, where the valve plate hermetically seals the gate opening; in the retreat stroke in which each piston moves up to the hermetically sealed position from the fully opened position via the intermediate position, the blocking mechanism of each head-side air cushion mechanism block the head-side communication path before the piston reaches the intermediate position; and in the advance stroke in which each piston moves up to the fully opened position from the hermetically sealed position via the intermediate position, the blocking mechanism of each rod-side air cushion mechanism block the rod-side communication path after the piston has passed the intermediate position.

In this case, it is desirable that the blocking mechanism of each head-side air cushion mechanism block the head-side communication path while the piston passes an intermediate point of the retreat stroke and reaches the intermediate position.

It is desirable that the hood be provided with an air damper with which the shaft supporting mechanism comes into contact with shock being absorbed when the valve plate has moved up to the intermediate position from the fully opened position; the air damper include a damper chamber that is formed at the hood, a cushion member that is fixedly accommodated in the damper chamber, a damper rod that is accommodated in the damper chamber so as to be slidable with a proximal end facing the cushion member and a distal end protruding out from the hood, and a damper pressure chamber that is formed between the damper rod and the cushion member; and the damper pressure chamber communicate with the rod-side main flow paths.

Each air cylinder may be provided with a first lock mechanism for locking the valve plate at the fully opened position and a second lock mechanism for locking the valve plate at the hermetically sealed position.

Advantageous Effects of Invention

In the gate valve of the present invention, when the gate opening is opened and closed by the valve plate, in both the advance stroke and the retreat stroke, the air cushion mechanisms reduce the speeds of the pistons of the pair of air cylinders, cause the pistons to slowly come into contact with the stroke ends with shock being absorbed, and cause the pistons to stop. Therefore, production of collision noise is reduced.

DESCRIPTION OF EMBODIMENTS

Figure 1:
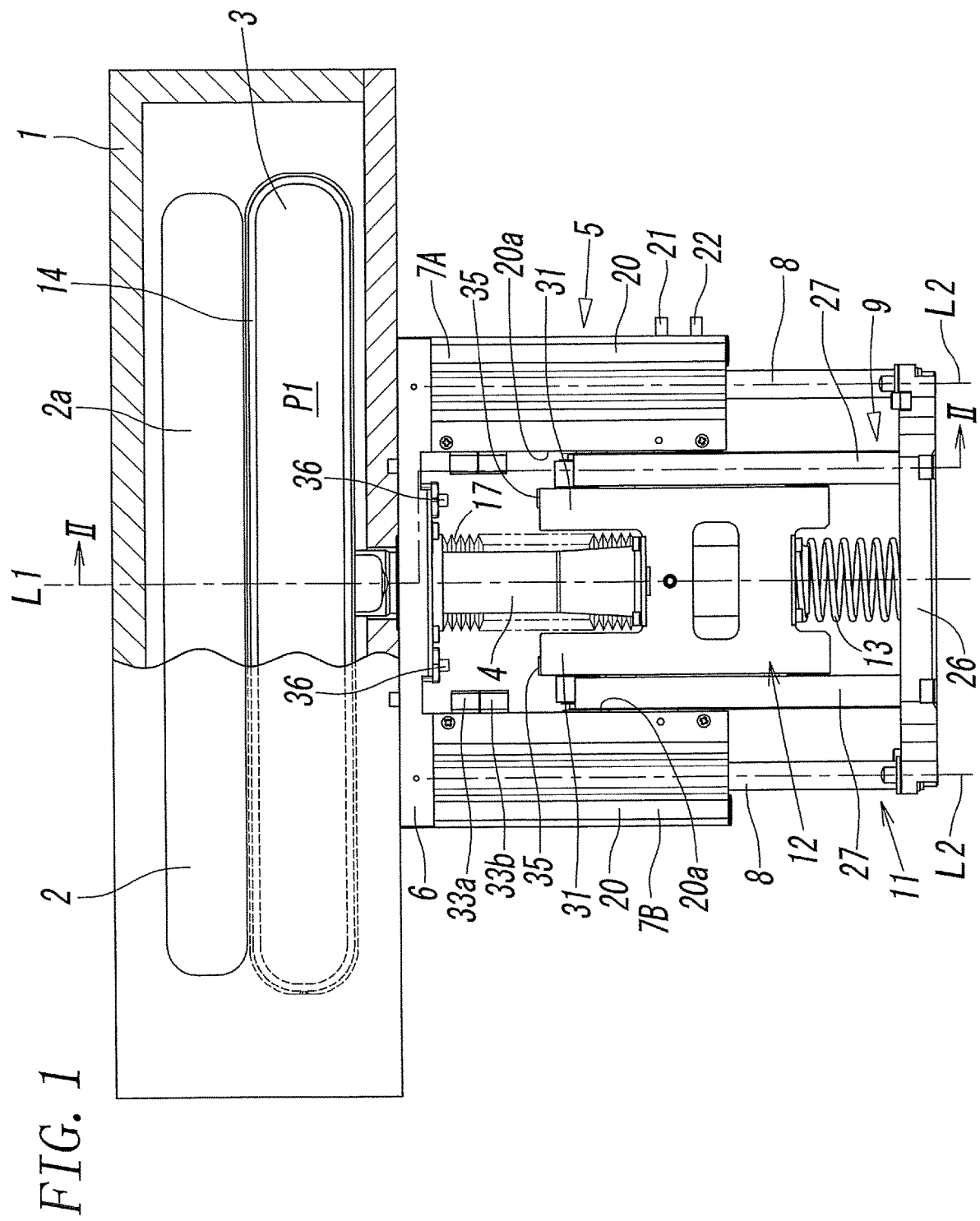
FIG. 1 is a front view of a gate valve according to the present invention and shows a state when a valve plate is at a fully opened position with a part of a valve box being cut away.

As shown in FIGS. 1 to 6, a gate valve according to the present invention includes a hollow valve box 1 having a gate opening 2 that communicates with a vacuum processing chamber (not shown), a valve plate 3 that is accommodated in the valve box 1 and that opens and closes the gate opening 2, a columnar valve shaft 4 on whose distal end the valve plate 3 is fixedly mounted, and a driving mechanism 5 that causes the valve plate 3 to perform an opening/closing operation via the valve shaft 4.

The driving mechanism 5 includes a hood 6 through which the valve shaft 4 displaceably extends, a pair of a right air cylinder 7A and a left air cylinder 7B that are mounted on the hood 6 parallel to each other with the valve shaft 4 interposed therebetween, driving rods 8 that extend downward from the pair of air cylinders 7A and 7B, and a shaft supporting mechanism 9 that is mounted on distal end portions of the driving rods 8.

The shaft supporting mechanism 9 includes a first block 11 that is fixed to the distal end portions of the driving rods 8 and a second block 12 that is connected to the first block 11 by a connecting member 13, formed from an elastic body, so as to be relatively displaceable. A proximal end portion of the valve shaft 4 is fixed to the second block 12.

Figure 2:
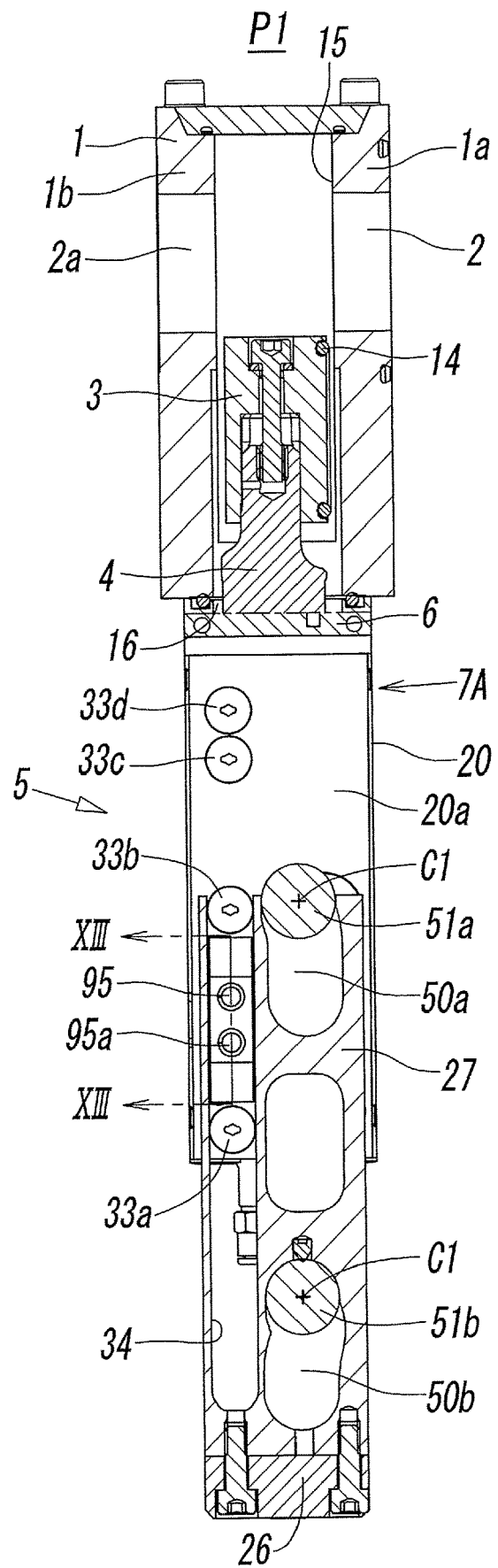
FIG. 2 is a sectional view along line II-II of FIG. 1.
Figure 3:
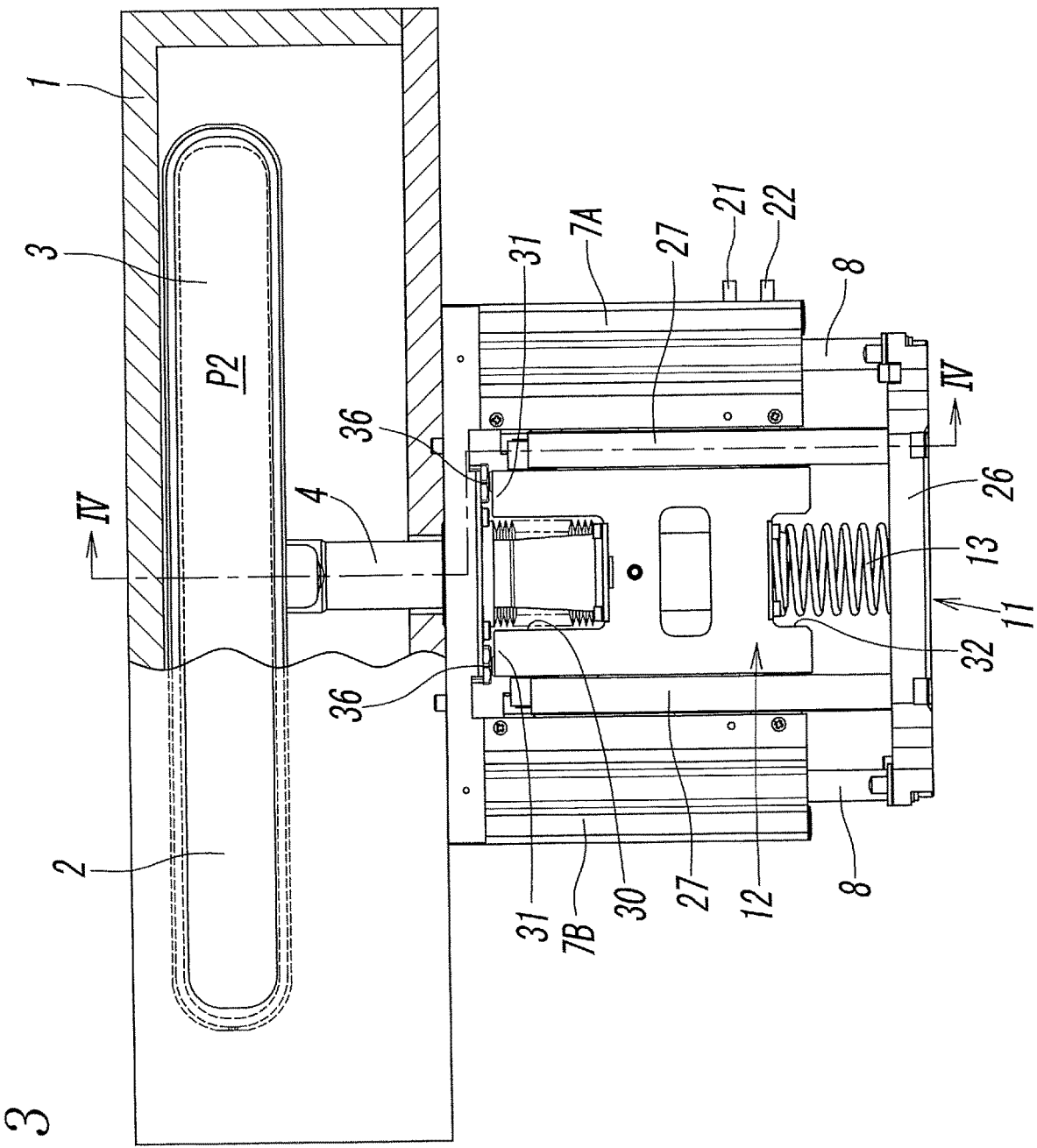
FIG. 3 is a front view of the gate valve in a state in which the valve plate has moved to an intermediate position from the state of FIG. 1.
Figure 4:
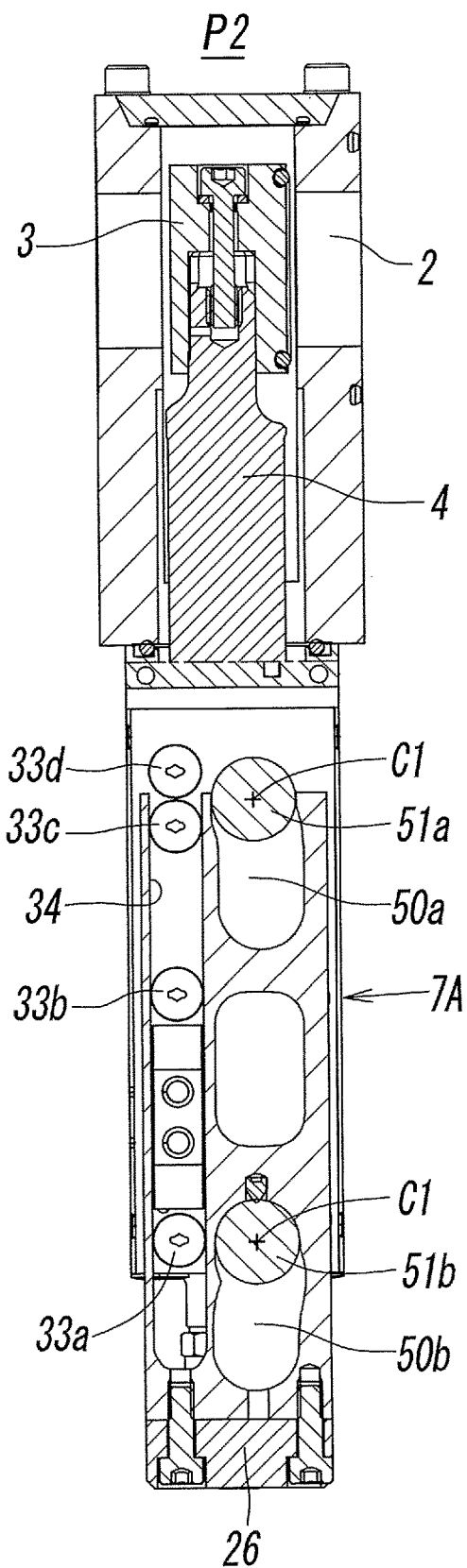
FIG. 4 is a sectional view along line IV-IV of FIG. 3.
Figure 5:
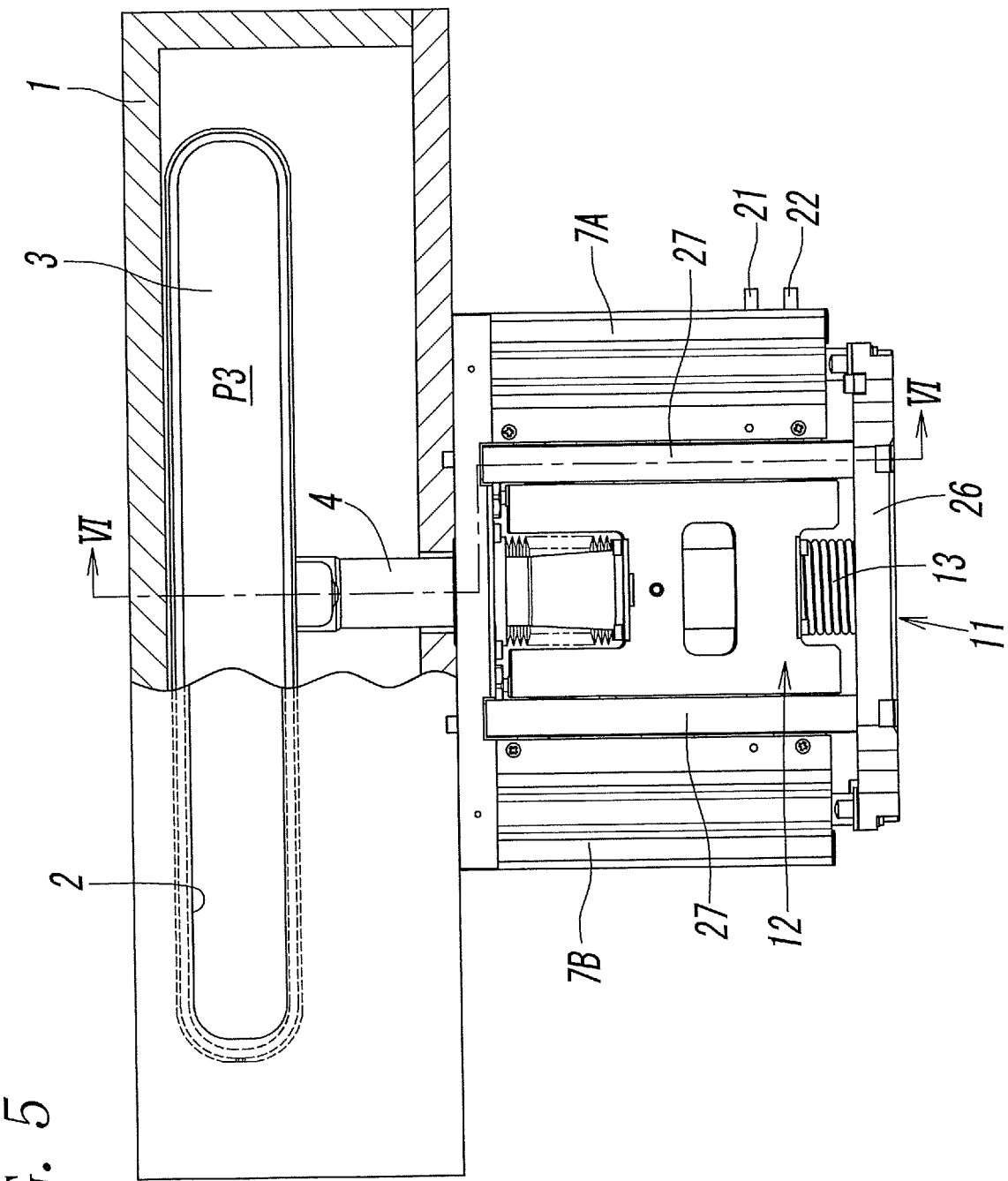
FIG. 5 is a front view of the gate valve in a state in which the valve plate has moved to a hermetically sealed position from the state of FIG. 3.
Figure 6:
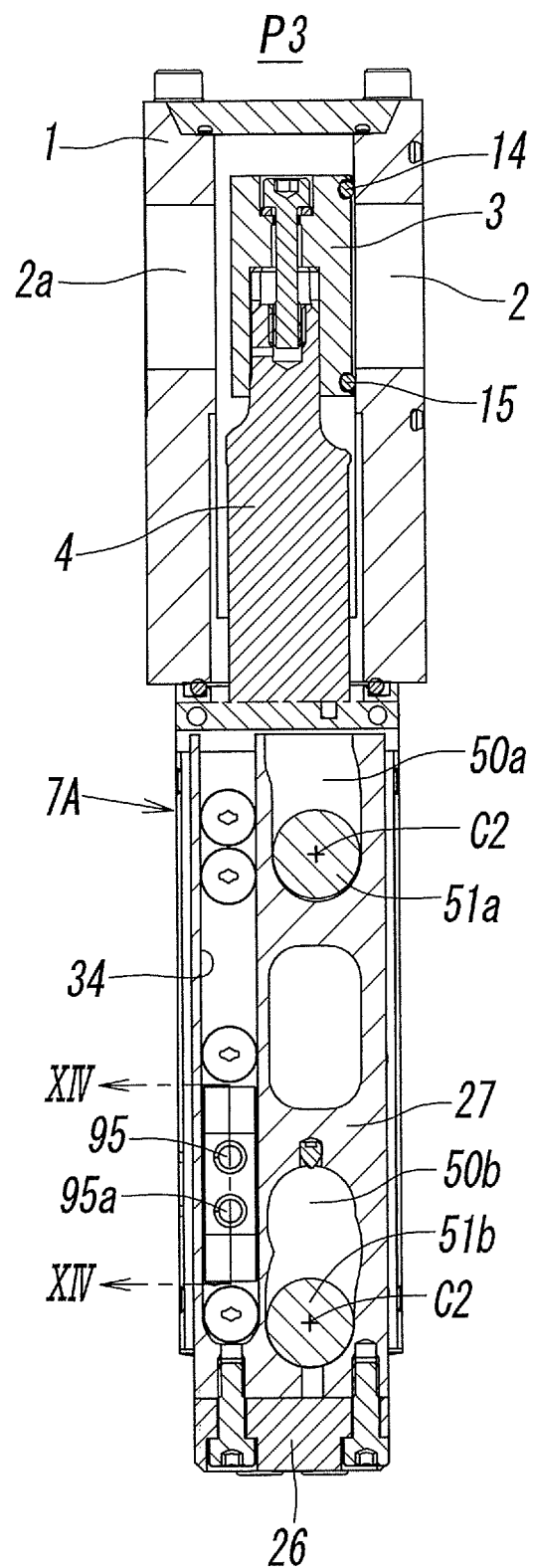
FIG. 6 is a sectional view along line VI-VI of FIG. 5.

The gate valve is one in which by causing the driving rods 8 to advance (move downward) and retreat (move upward) at the pair of air cylinders 7A and 7B, the shaft supporting mechanism 9 causes the valve shaft 4 to move downward and upward, so that the valve plate 3 is moved to a fully opened position P1 as shown in FIGS. 1 and 2, the valve plate 3 is moved to an intermediate position P2 as shown in FIGS. 3 and 4, and the valve plate 3 is moved to a hermetically sealed position P3 as shown in FIGS. 5 and 6. The fully opened position P1 is where the valve plate 3 exists at a downward position and the gate opening 2 is fully opened. The intermediate position P2 is where the valve plate 3 has moved upward and is apart from the gate opening 2 though the valve plate 3 faces the gate opening 2. The hermetically sealed position P3 is where the valve plate 3 has pushed a valve seal 14 against a valve seat 15 around the gate opening 2 to hermetically seal the gate opening 2.

The valve plate 3 has a substantially rectangular plate shape that is elongated in a left-right direction, and has an annular seal groove formed in an outer peripheral portion of one surface thereof. The annular valve seal 14, formed of an elastic material such as an O ring, is mounted in the seal groove such that a part of the valve seal 14 protrudes from the seal groove.

The valve box 1 has a front wall 1a and a rear wall 1b that are opposite to each other. The gate opening 2 is formed in the front wall 1a, and a rear-portion opening 2a that has the substantially the same shape and the same size as the gate opening 2 is formed in the rear wall 1b at the same height as the gate opening 2.

Similarly to the valve plate 3, the gate opening 2 has a substantially rectangular shape that is elongated in the left-right direction, and the gate opening 2 is smaller than the valve plate 3. In addition, the annular valve seat 15, formed from a flat surface, is provided on an outer peripheral portion of the gate opening 2 at an inner surface of the front wall 1a so as to surround the gate opening 2. By causing the valve seal 14 to come into contact with and to separate from the valve seat 15 due to the movement of the valve plate 3, the gate opening 2 is closed and opened.

The hood 6 is air-tightly fixed to a bottom wall of the valve box 1, and the valve shaft 4 is inserted into a through hole 16 formed in the bottom wall and the hood 6 so as to be displaceable in a direction of an axial line L1 of the valve shaft 4 and in a direction perpendicular to the axial line L1 (that is, a perpendicular direction with respect to the valve seat 15).

On an outward side of the valve box 1 from the through hole 16, the valve shaft 4 is closed by a cylindrical bellows 17 that expands and contracts due to the movement of the valve shaft 4 in the direction of the axial line L1. One end of the bellows 17 is fixed to an outer surface of the hood 6 so as to surround the through hole 16, and the other end of the bellows 17 is air-tightly fixed to the second block 12.

The pair of air cylinders 7A and 7B are provided, one on each of facing positions with the valve shaft 4 interposed therebetween. Each of the air cylinders 7A and 7B includes a prismatic hollow cylinder housing 20. Inner walls 20a of the cylinder housings 20 facing cam frames 27 at side surfaces of the first block 11 are fixed vertically along an axial line L2 to a lower surface of the hood 6. Therefore, the driving rods 8 move upward and downward along the axial line L2.

In the present embodiment, the inner walls 20a of the cylinder housings 20 are also roller frames for mounting guide rollers 33a, 33b, 33c, and 33d described below. Therefore, in the description below, the inner walls 20a may also be called "roller frames 20a". However, the roller frames 20a only need to be in a fixed relationship with the cylinder housings 20 of the air cylinders 7A and 7B. For example, the roller frames 20a can also be formed separately from the cylinder housings 20 and can be fixed to the cylinder housings 20.

Figure 7:
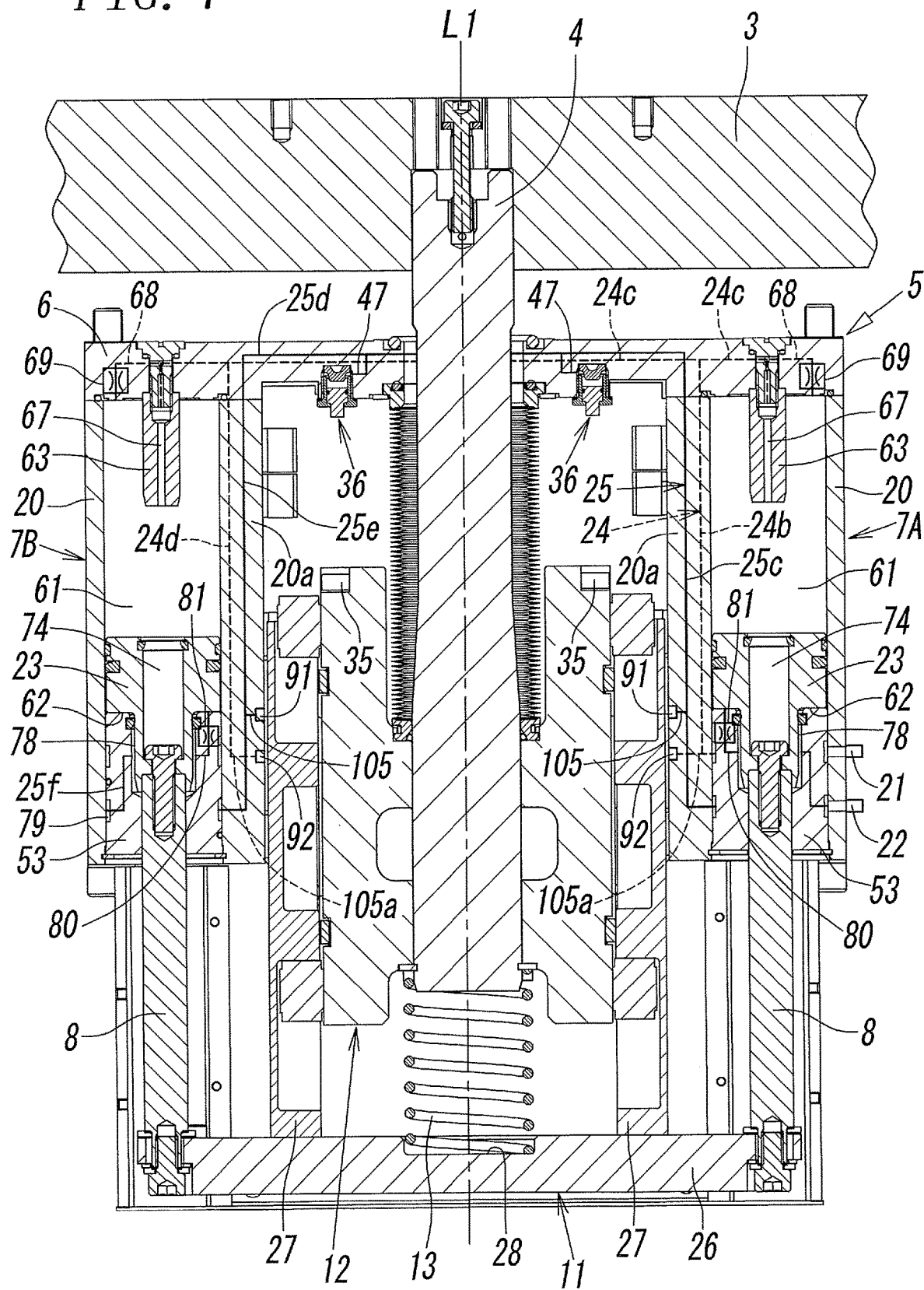
FIG. 7 is a sectional view partially schematically showing a structure of a pair of air cylinders and an arrangement of air flow paths with respect to the air cylinders.

As is clear from FIG. 7, a head-side port 21 and a rod-side port 22 are provided at an outer surface of the cylinder housing 20 of the air cylinder 7A of the pair of air cylinders 7A and 7B. By supplying and discharging compressed air to the pair of air cylinders 7A and 7B from the head-side port 21 and the rod-side port 22, pistons 23 in the cylinder housings 20 advance (move downward) and retreat (move upward), so that the driving rods 8 advance (move downward) and retreat (move upward).

For example, the structures of the air cylinders 7A and 7B and the arrangement of air flow paths are described in detail later.

The first block 11 of the shaft supporting mechanism 9 includes a supporting board 26 that is provided between a distal end portion of the driving rod 8 of the air cylinder 7A and a distal end portion of the driving rod 8 of the air cylinder 7B, and a pair of the left and right cam frames 27 whose proximal end portions are fixed to the supporting board 26 and have plate shapes extending upward and parallel to the axial line L2. Each cam frame 27 is positioned between the second block 12 and the inner wall 20a of the air cylinder 7A or 7B.

The supporting board 26 has a plate shape that is elongated towards the left and the right, is disposed on a side opposite to the hood 6 with the second block 12 interposed therebetween, and extends parallel to the hood 6. A concave-shaped spring seat 28 is formed in a surface of the supporting board 26 facing the second block 12, and a compression spring that constitutes the connecting member 13 is interposed between the spring seat 28 and the second block 12. Therefore, in the description below, the connecting member is called the compression spring 13.

The second block 12 of the shaft supporting mechanism 9 is fixed to the proximal end portion of the valve shaft 4. The second block 12 has a substantially H shape in front view, and includes a first concave portion 30 that is formed in the center of an end surface facing the hood 6, a pair of shoulder portions 31 that are each formed on a corresponding one of left and right side walls defining the first concave portion 30, and a second concave portion 32 that is formed in the center of an end surface on the side opposite to the hood 6 in the direction of the axial line L1. The valve shaft 4 extends through the center of the first concave portion 30 and the center of the second concave portion 32 and is fixed to the second block 12. Further, the bellows 17 whose one end is fixed to the hood 6 has the other end fixed to the first concave portion 30, and the compression spring 13 whose one end is fixed to the spring seat 28 of the supporting board 26 has its other end fixed to the second concave portion 32.

In this way, by connecting the supporting board 26 of the first block 11 and the second block 12 to each other by the compression spring 13, the second block 12 can be moved relative to the first block 11 in the directions in which the compression spring 13 is stretched and compressed (in the directions of the axial line L1 of the valve shaft 4 and parallel to the surface of the valve seat 15) and in directions perpendicular thereto (directions perpendicular to the surface of the valve seat 15).

In order to move the valve plate 3 to the fully opened position P1, the intermediate position P2, and the hermetically sealed position P3, the gate valve has a parallel movement mechanism and a vertical movement mechanism.

The parallel movement mechanism moves the valve plate 3 parallel to the valve seat 15 from the fully opened position P1 of FIGS. 1 and 2 to the intermediate position P2 of FIGS. 3 and 4, and includes the plurality of guide rollers 33a, 33b, 33c, and 33d that are mounted on the roller frames 20a of the cylinder housings 20 and guide grooves 34 that are formed in the cam frames 27 of the first block 11.

In the illustrated embodiment, the guide rollers 33a, 33b, 33c, and 33d are four in number, and the four guide rollers 33a, 33b, 33c, and 33d are arranged in one column in an up-down direction (direction parallel to the axial line L2).

On the other hand, the guide grooves 34 are formed in side surfaces of the cam frames 27, that is, in side surfaces facing a side of the roller frames 20a of the cylinder housings 20 so as to extend parallel to the axial line L2 up to locations close to lower ends from upper ends of the cam frames 27. The guide grooves 34 are formed in concave groove shapes having a depth that is approximately ⅔ of the thicknesses of the cam frames 27 without extending through the cam frames 27 in a thickness direction of the cam frames 27. Bottom walls 34a (see FIG. 13) of the guide grooves 34 are flat surfaces.

Due to the upward movement of the driving rods 8, the first block 11 and the second block 12 move upward together. When the valve plate 3 moves from the totally opened position P1 to the intermediate position P2, as shown in FIGS. 2 and 4, the two lower guide rollers 33a and 33b that are previously fitted in the guide grooves 34 move relatively downward in the guide grooves 34, and the upper guide roller 33c is fitted in the guide groove 34 to prevent the first block 11 and the second block 12 from tilting with respect to the cylinder housings 20. As a result, the driving rods 8 and the valve plate 3 move upward parallel to the valve seat 15 from the fully opened position P1 to the intermediate position P2.

When the first block 11 and the second block 12 reach the intermediate position P2, contact portions 35 of the two shoulder portions 31 of the second block 12 come into contact with two air dampers 36 formed on the lower surface of the hood 6 with the valve shaft 4 interposed therebetween, and the second block 12 stops at this position. The contact portions 35 are formed from rollers that are rotatable around a horizontal axis.

The air dampers 36 are for absorbing shock when the second block 12 comes into contact with the lower surface of the hood 6 at the intermediate position P2. The air dampers 36 have the function of absorbing shock by air-cushioning and the function of absorbing shock by rubber cushion members, and have the following structure.

Figure 12:
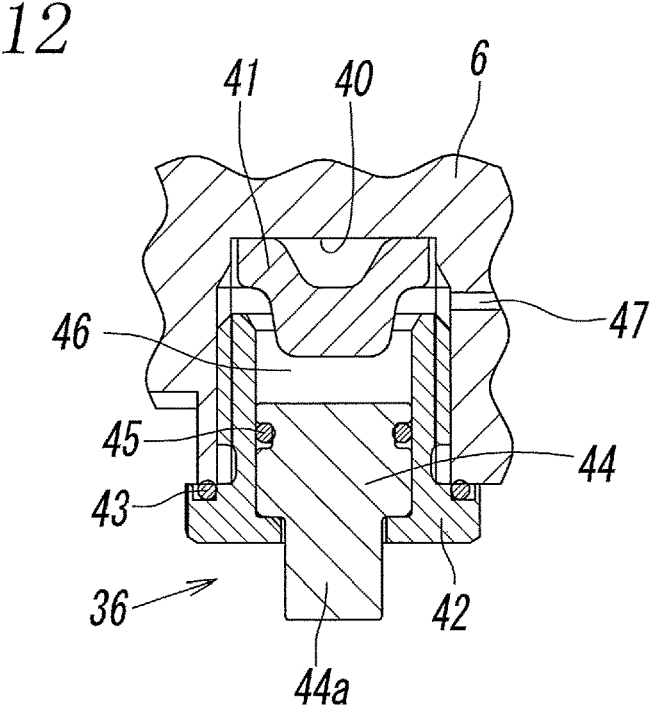
FIG. 12 is an enlarged view of a main portion showing in enlarged form a portion of an air damper section in FIG. 7.

That is, as shown in FIG. 12, each air damper 36 includes a damper chamber 40 that is formed at the hood 6. In an inside bottom portion of each damper chamber 40, a rubber cushion member 41 having a convex shape facing downward is fixedly accommodated, and in an opening portion of each damper chamber 40, a cap-shaped cushion holder 42 is airtightly screwed via a seal member 43. With a proximal end surface of each damper rod 44 facing the cushion member 41 and a distal end portion 44a of each damper rod 44 protruding downward from the cushion holder 42, each damper rod 44 is held by the cushion holder 42 so as to freely advance and retreat (move upward and downward) via the seal member 45.

Damper pressure chambers 46 are formed between the proximal end surfaces of the damper rods 44 and the cushion members 41. The damper pressure chambers 46 communicate with the rod-side port 22 via damper communication paths 47 and rod-side main flow paths 25 (see FIG. 7), and, when each driving rod 8 moves upward, compressed air is supplied from the rod-side port 22. When each driving rod 8 moves downward, since the rod-side port 22 is in an air discharge state, the damper pressure chambers 46 are also in an air discharge state.

Each air damper 36 operates as follows. That is, when, at the intermediate position P2, the contact portions 35 of the shoulder portions 31 of the second block 12 come into contact with the distal end portions 44a of the damper rods 44, the damper rods 44 retreat due to shock and air is compressed inside the damper pressure chambers 46. Therefore, impact force is absorbed due to an air-cushioning effect at this time. Thereafter, the damper rods 44 are pushed by the second block 12 and retreat further, and stop at locations where they contact the cushion members 41. The impact force at this time is absorbed by the elastic force of each cushion member 41. When the damper rods come into contact with the cushion members 41 and stop, the second block 12 also stops at this position.

The vertical movement mechanism is for moving the valve plate 3 perpendicularly to the valve seat 15 from the intermediate position P2 in FIGS. 3 and 4 to the hermetically sealed position P3 in FIGS. 5 and 6. As shown in FIGS. 2, 4, and 6, the vertical movement mechanism includes two cam grooves 50a and 50b, which are upper and lower cam grooves, formed in the cam frames 27 of the first block 11, and two cam rollers 51a and 51b, which are upper and lower cam rollers, mounted on the second block 12. The upper first cam roller 51a is fitted to the upper first cam groove 50a, and the lower second cam roller 51b is fitted to the lower second cam groove 50b.

The first cam groove 50a is in its entirety gradually tilted in an approaching direction with respect to the surface of the valve sheet 15 from a side of the hood 6 towards a side of the supporting board 26. An end portion of the first cam groove 50a on the side of the hood 6 opens towards the hood 6.

When the valve plate 3 is at the fully opened position P1 and the intermediate position P2, as shown in FIGS. 2 and 4, the first cam roller 51a is at a first position C1 at an upper end of the first cam groove 50a.

On the other hand, the second cam groove 50b includes an upper region that is parallel to the first cam groove 50a (a region on the side of the hood 6) and a lower region that is gradually tilted away from the surface of the valve seat 15 (a region on the side of the supporting board 26) from the side of the hood 6 towards the side of the supporting board 26. These two regions are connected to each other to form a convex bent shape at a surface side of the valve seat 15.

When the valve plate 3 is at the fully opened position P1 and the intermediate position P2, as shown in FIGS. 2 and 4, the second cam roller 51b is positioned at a first position C1 at an upper end of the second cam groove 50b.

The vertical movement mechanism operates as follows. That is, when, after the second block 12 has stopped at the intermediate position P2 shown in FIGS. 3 and 4, the driving rods 8 move further upward, the first block 11 moves together with the driving rods 8 while compressing the compression spring 13. Therefore, the cam grooves 50a and 50b formed in the cam frames 27 move upward with respect to the cam rollers 51a and 51b, and, as shown in FIG. 6, move up to positions C2 at lower ends of the cam grooves 50a and 50b. Consequently, due to the mutual action between the cam rollers 51a and 51b and the cam grooves 50a and 50b, the second block 12 and the valve plate 3 move perpendicularly with respect to the valve seat 15, and the valve plate 3 pushes the valve seal 14 against the valve seat 15 and occupies the hermetically sealed position P3 where the gate opening 2 is closed.

At this time, with the contact portions 35 in contact with the damper rods 44 of the air dampers 36, the second block 12 is displaced with respect to the damper rods 44. Since the contact portions 35 are formed from rollers, the second block 12 is smoothly displaced due to the rotation of the rollers.

On the other hand, when the valve plate 3 is to be driven from the hermetically sealed position P3 up to the fully opened position P1 via the intermediate position P2, the driving rods 8 of the two air cylinders 7A and 7B are moved downward to perform operations that are the reverse of the operations above.

Next, for example, the structures of the pair of air cylinders 7A and 7B and the arrangement of air flow paths are described in detail with reference to FIGS. 7 to 11.

The pair of air cylinders 7A and 7B each include an air cushion mechanism that reduces shock when opening and closing the gate opening 2 by the valve plate 3, and each have the same internal structure. However, since the head-side port 21 and the rod-side port 22 are formed in the one air cylinder 7A that is positioned on the right in FIG. 7, the arrangement of air flow paths slightly differ.

Figure 8:
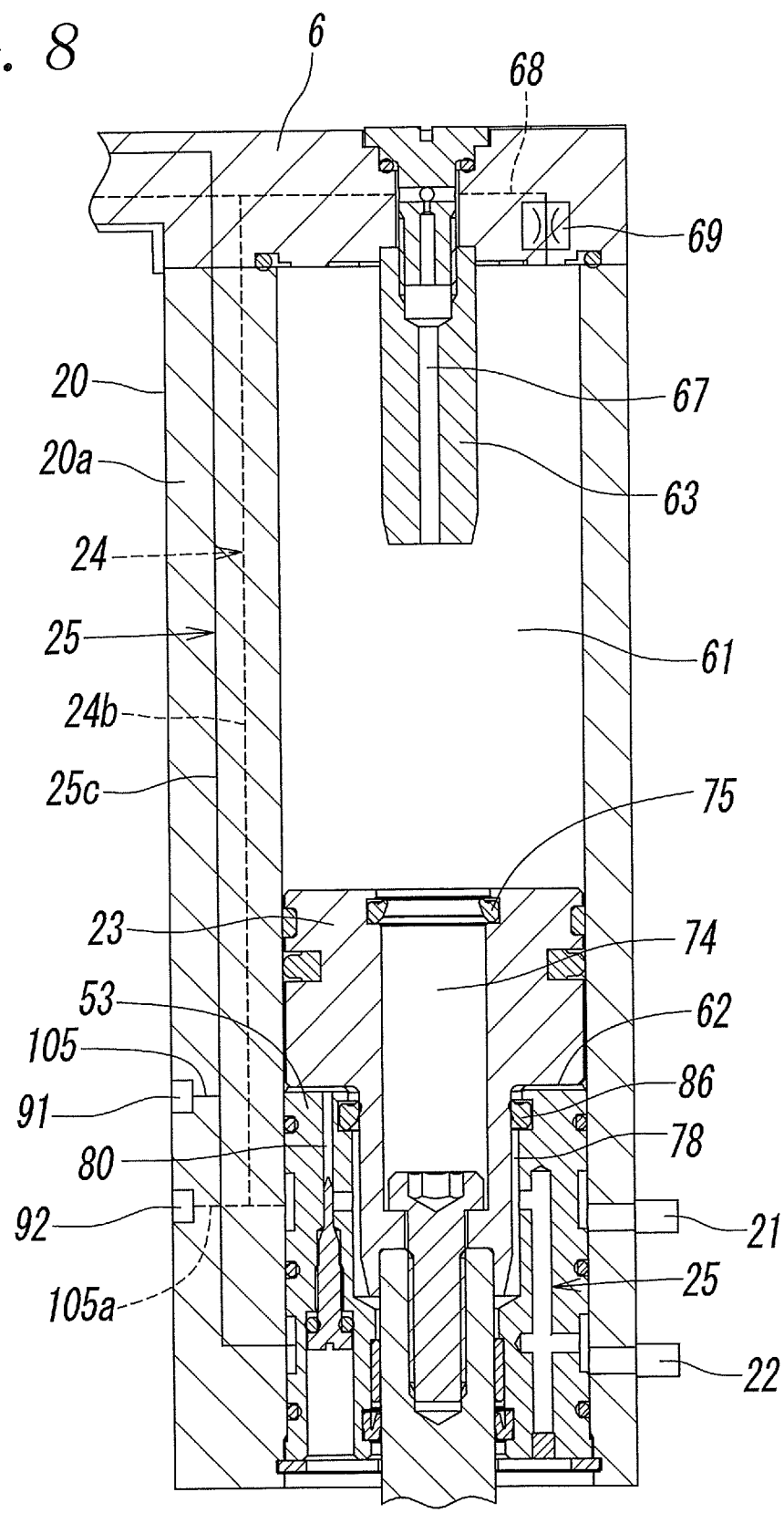
FIG. 8 is a sectional view in enlarged form of one of the pair of air cylinders in FIG. 7, and shows an operation position of the air cylinder when the valve plate is at the fully opened position.
Figure 10:
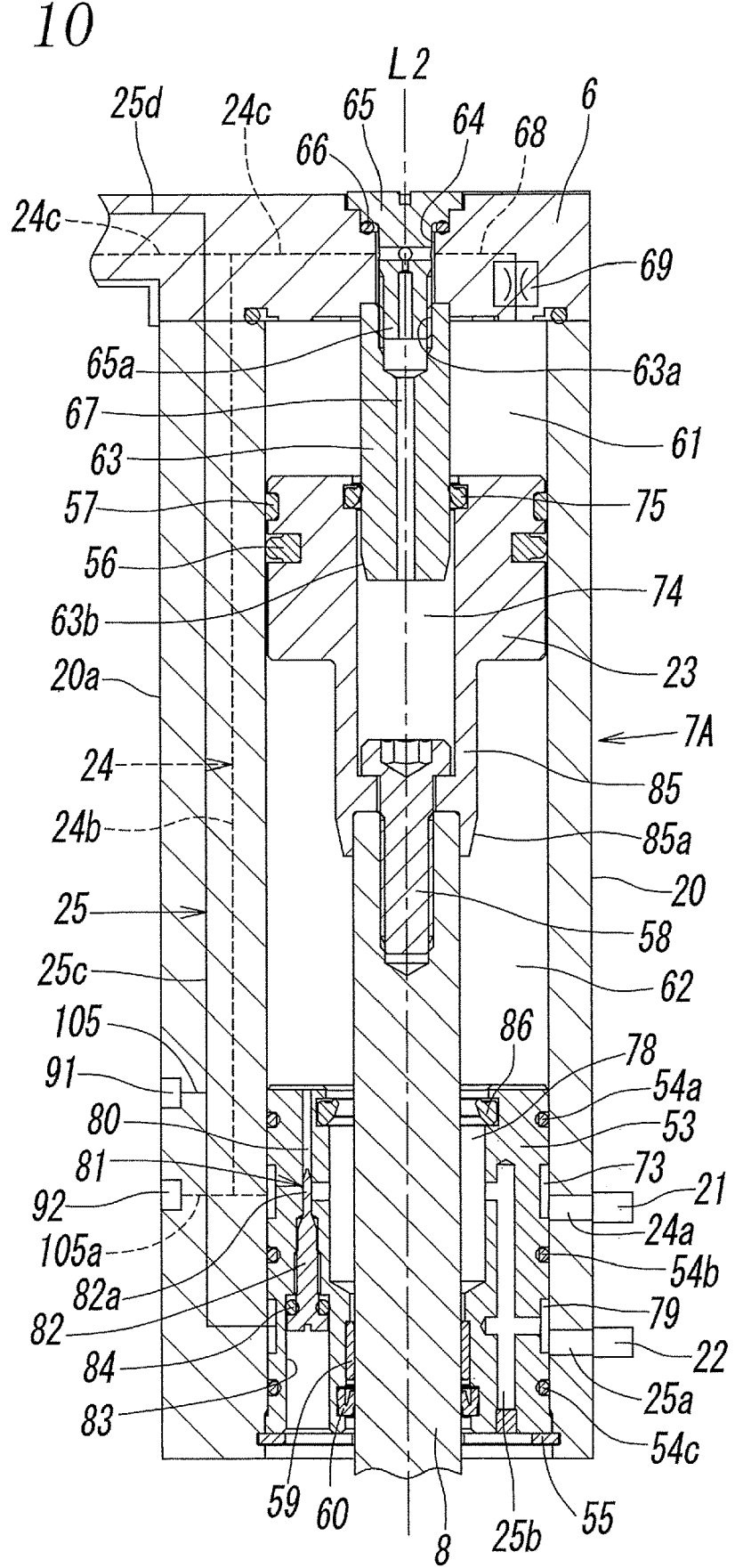
FIG. 10 is a sectional view of an operation position of the air cylinder when the valve plate has moved to the intermediate position from the state shown in FIG. 7.
Figure 11:
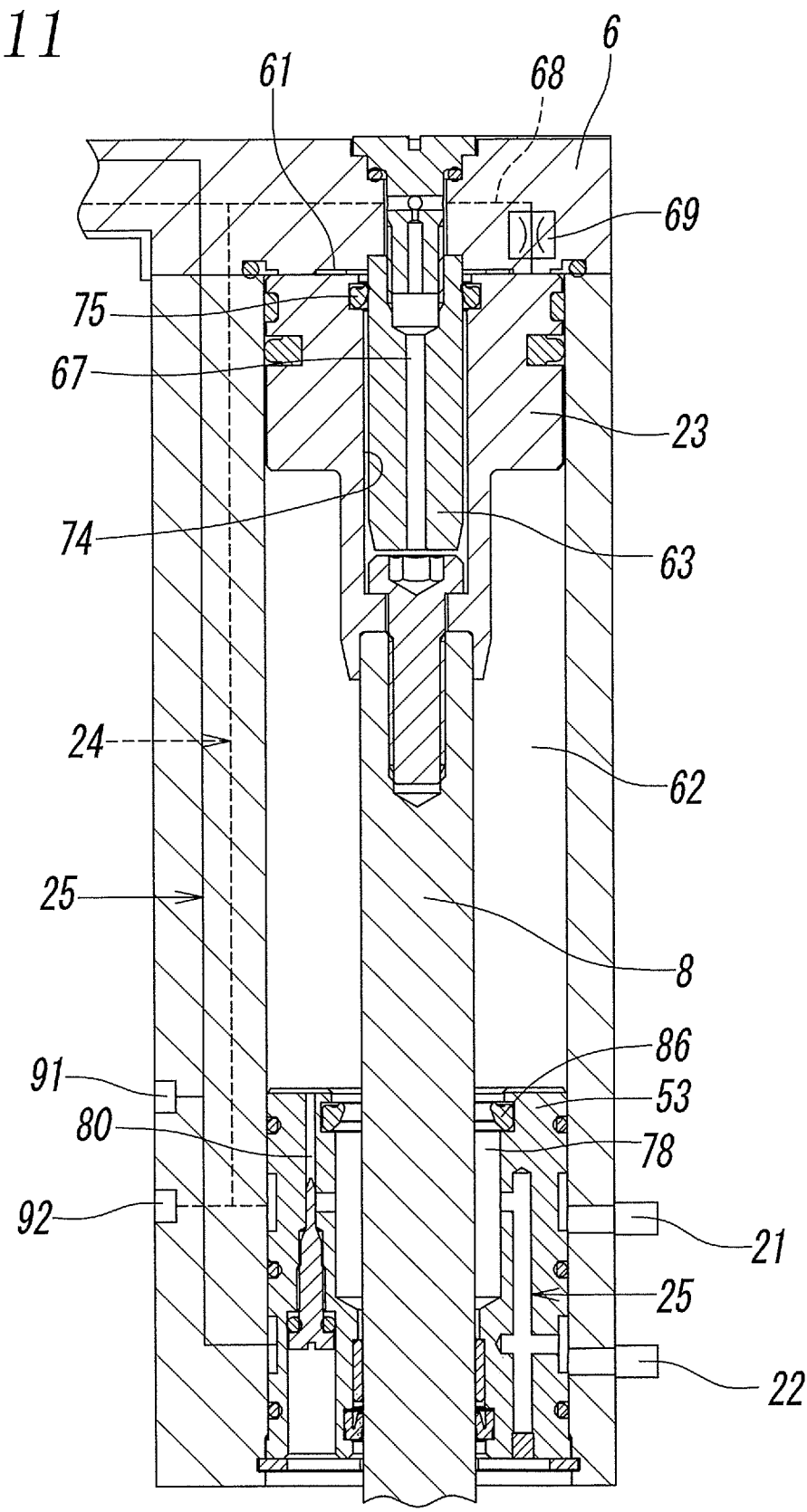
FIG. 11 is a sectional view of an operation position of the air cylinder when the valve plate has moved to the hermetically sealed position from the state of FIG. 10.

In the description below, if necessary, the one air cylinder 7A in which the head-side port 21 and the rod-side port 22 are formed is called a first air cylinder 7A, and the other air cylinder 7B is called a second air cylinder 7B. When it is not necessary to distinguish between the air cylinders 7A and 7B and denote them, both of them are simply called "air cylinders 7". FIGS. 8, 10, and 11 typically show the first air cylinder 7A.

As illustrated in FIGS. 7 and 10, each air cylinder 7 includes the hollow cylinder housing 20 fixed to one end of the hood 6. One end (upper end) of each cylinder housing 20 is airtightly sealed by the hood 6, and the other end (lower end) of each cylinder housing 20 is closed by a cylindrical collar 53 airtightly inserted in the cylinder housing 20 via three O rings 54a, 54b, and 54c. Each collar 53 is fixed to the cylinder housing 20 by a C-shaped ring 55.

The pistons 23 are accommodated in the cylinder housings 20 via piston seals 56 and guide rings 57 so as to be slidable in the direction of the axial line L2. Proximal ends of the driving rods 8 are connected to the pistons 23 with connecting screws 58. Distal ends of the driving rods 8 are slidably inserted in central holes of the collars 53 via bearing members 59 and rod seals 60 and extend downward from the cylinder housings 20.

Each head-side pressure chamber 61 that is defined by the piston 23 and the hood 6 is formed on one surface side of the piston 23. Each rod-side pressure chamber 62 that is defined by the piston 23 and the collar 53 is formed on the other surface side of the piston 23. Therefore, the hood 6 forms an end wall of each head-side pressure chamber 61, and the collars 53 form end walls of the rod-side pressure chambers 62. The collars 53 constitute a part of the cylinder housings 20.

Circular columnar head-side cushion shafts 63 that protrude along the axial line L2 into the head-side pressure chambers 61 from the hood 6 are provided at the head-side pressure chambers 61. The head-side cushion shafts 63 are fixed to the hood 6 by screwing screw sections 65a on distal ends of mounting bolts 65 airtightly mounted on mounting holes 64 of the hood 6 via O rings 66 into screw holes 63a at upper end portions of the head-side cushion shafts 63. Head-side communication paths 67 that open into the head-side pressure chambers 61 are formed in the centers of the head-side cushion shafts 63 and the centers of the mounting bolts 65. The head-side communication paths 67 communicate with the head-side main flow paths 24 connected to the head-side port 21.

Head-side restricting flow path 68 each including a restricting portion 69 having a small flow-path cross-sectional area are formed in the hood 6 to cause the head-side pressure chambers 61 and the head-side main flow paths 24 to communicate with each other. The head-side restricting flow paths 68 and the head-side communication paths 67 are disposed in parallel.

Figure 9:
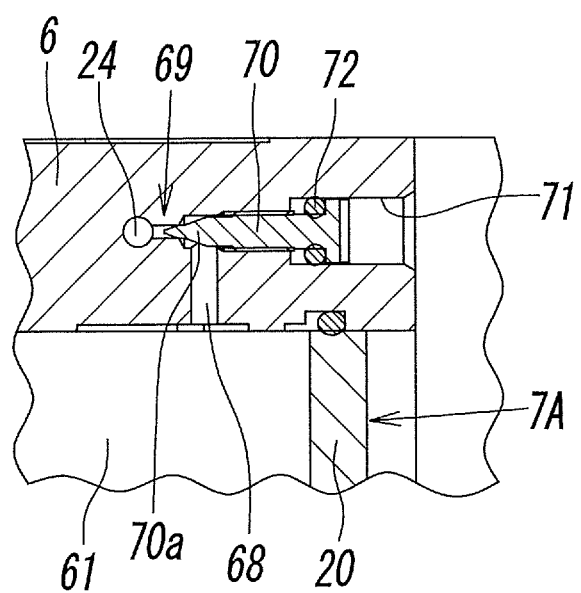
FIG. 9 is an enlarged sectional view of an actual structure of a restricting portion formed in a head-side restricting flow path in FIG. 8.

As shown in FIG. 9, the restricting portion 69 of each head-side restricting flow path 68 is formed from a needle valve 70. The needle valves 70 are accommodated in valve holes 71 formed in the hood 6 via O rings 72. The restricting portions 69 are formed from distal-end needles 70a. Each needle valve 70 may have a structure that allows the flow-path cross-sectional area of the restricting portion 69 to be adjusted by causing the needle valve 70 to freely advance and retreat.

However, each restricting portion 69 may be formed from a small hole whose cross-sectional area is narrow without being formed from the needle valve 70.

As shown in FIGS. 7 and 10, the head-side main flow path 24 includes a first portion 24a that extends from the head-side port 21 to an annular flow path 73, which surrounds an outer periphery of the collar 53, by traversing a side wall of the cylinder housing 20 of the first air cylinder 7A, a second portion 24b that extends from the annular flow path 73 to the hood 6 by extending in the side wall of the cylinder housing 20 so as to be parallel to the axial line L2, and a pair of third portions 24c and 24c that form a branch from the second portion 24b and extend in opposite directions in the hood 6. One of the third portions 24c communicates with the head-side communication path 67 and the head-side restricting flow path 68 of the first air cylinder 7A, and the other third portion 24c communicates with the head-side communication path 67 and the head-side restricting flow path 68 of the second air cylinder 7B.

Concave-shaped head-side cushion holes 74 that open in the head-side pressure chambers 61 are formed in the pistons 23 along the axial line L1, and head-side cushion packings 75 are provided on open ends of the head-side cushion holes 74. By fitting the head-side cushion shafts 63 in the head-side cushion holes 74 via the head-side cushion packings 75 when the pistons 23 that move upward have passed an intermediate point of an ascending stroke and have approached an ascending stroke end, the head-side communication paths 67 are blocked from the head-side pressure chambers 61 to provide an air-cushioning effect.

Each head-side cushion packing 75 is a lip-shaped packing having a seal directional property. The lips being oriented so that an air flow flowing towards the head-side cushion holes 74 from the head-side pressure chambers 61 is blocked and an air flow flowing towards the head-side pressure chambers 61 from the head-side cushion holes 74 is allowed are mounted on the pistons 23.

Distal end portions 63b of the head-side cushion shafts 63 have a conical shape that tapers gradually so as to make it easier to fit the distal end portions 63b in the head-side cushion packings 75.

The head-side cushion shafts 63, the head-side cushion holes 74, the head-side cushion packings 75, the head-side communication paths 67, and the head-side restricting flow paths 68 form head-side air cushion mechanisms.

The head-side cushion shafts 63, the head-side cushion holes 74, and the head-side cushion packings 75 form blocking mechanisms for blocking the head-side communication paths 67 from the head-side pressure chambers 61.

On the other hand, on a side of the rod-side pressure chamber 62 of each air cylinder 7, in the collar 53, a concave-shaped rod-side cushion hole 78 that opens into the rod-side pressure chamber 62 is formed along the axial line L2. The driving rods 8 extend in the centers of the rod-side cushion holes 78. The rod-side cushion holes 78 communicates with the rod-side port 22 by the rod-side main flow paths 25.

The rod-side main flow path 25 includes a first portion 25a that extends from the rod-side port 22 to an annular flow path 79, which surrounds the outer periphery of the collar 53, by traversing the side wall of the cylinder housing 20 of the first air cylinder 7A, and a second portion 25b that extends from the annular flow path 79 to the rod-side cushion hole 78 via the inside of the collar 53. The rod-side main flow path 25 communicates with the rod-side pressure chamber 62 of the first air cylinder 7A via the rod-side cushion hole 78. Therefore, the rod-side cushion hole 78 can be defined as a rod-side communication path that connects the rod-side main flow path 25 and the rod-side pressure chamber 62 to each other.

In order to cause the rod-side port 22 to communicate with the rod-side pressure chamber 62 of the second air cylinder 7B, the rod-side main flow path 25 includes a third portion 25c that extends from the annular flow path 79 of the first air cylinder 7A to the hood 6 by extending parallel to the axial line L2 inside the side wall of the cylinder housing 20 of the first air cylinder 7A, a fourth portion 25d that transversely extends inside the hood 6, a fifth portion 25e that extends downward along the axial line L2 inside a side wall of the cylinder housing 20 of the second air cylinder 7B from the fourth portion 25d, and that communicates with an annular flow path 79 surrounding an outer periphery of the collar 53, and a sixth portion 25f that connects the annular flow path 79 and the rod-side cushion hole 78 inside the collar 53. The rod-side main flow path 25 communicates with the rod-side pressure chamber 62 of the second air cylinder 7B via the rod-side cushion hole 78. The fourth portion 25d also communicates with the damper communication paths 47 of the air dampers 36.

A rod-side restricting flow path 80 including a restricting portion 81 having a small flow-path cross-sectional area is formed inside the collar 53 of each of the first air cylinder 7A and the second air cylinder 7B. The rod-side restricting flow paths 80 connect the rod-side pressure chambers 62 and the rod-side cushion holes 78 to each other. Therefore, the rod-side restricting flow paths 80 are connected in parallel with the rod-side cushion holes 78 (the rod-side communication paths) between the rod-side main flow paths 25 and the rod-side pressure chambers 62.

In the illustrated example, the restricting portion 81 of each rod-side restricting flow path 80 is formed from a needle valve 82. The needle valves 82 are accommodated parallel to the axial line L2 via O rings 84 inside valve holes 83 formed in the collars 53, and the restricting portions 81 are formed by distal-end needles 82a. The needle valves 82 may also be formed so that by causing the needle valves 82 to advance and retreat freely, the flow-path cross-sectional areas of the restricting portions 81 are adjustable.

However, the restricting portions 81 need not be formed from the needle valves 82, and can be formed from a small hole having a narrow cross-sectional area.

Rod-side cushion shafts 85 having a diameter that is larger than the diameter of the driving rods 8 are formed at portions, to which the driving rods 8 are connected, of the pistons 23 of the air cylinders 7A and 7B. A rod-side cushion packing 86 is mounted on an open end of each rod-side cushion hole 78.

By fitting the rod-side cushion shafts 85 in the rod-side cushion holes 78 via the rod-side cushion packings 86 when the pistons 23 that move downward have passed an intermediate point of a descending stroke and have approached a descending stroke end, the rod-side cushion holes 78 are blocked from the rod-side pressure chambers 62 to provide an air-cushioning effect. In order to make the fitting smooth, a distal end portion 85a of each rod-side cushion shaft 85 has a conical shape that tapers gradually.

Each rod-side cushion packing 86 is a lip-shaped packing having a seal directional property. The lips being oriented so that a flow of air flowing towards the rod-side cushion holes 78 from the rod-side pressure chambers 62 is blocked and a flow of air flowing towards the rod-side pressure chambers 62 from the rod-side cushion holes 78 is allowed are mounted on the rod-side cushion holes 78.

The rod-side cushion shafts 85, the rod-side cushion holes 78 (the rod-side communication paths), the rod-side cushion packings 86, and the rod-side restricting flow paths 80 form rod-side air cushion mechanisms.

The rod-side cushion shafts 85, the rod-side cushion holes 78, and the rod-side cushion packings 86 form blocking mechanisms for blocking the rod-side communication paths from the rod-side pressure chambers 62.

Next, the operations of the pair of air cylinders 7A and 7B are described. Although FIGS. 8, 10, and 11 show an operation state of the first air cylinder 7A, the operation is the same as the operation of the second air cylinder 7B.

FIGS. 7 and 8 show the operation states of the air cylinders 7A and 7B when the valve plate 3 is at the fully opened position P1 of FIG. 1. At this time, the head-side port 21 is in an air supply state, and the rod-side port 22 is in an air discharge state. Therefore, air from the head-side port 21 is supplied to the head-side pressure chambers 61 of the air cylinders 7A and 7B from the head-side main flow paths 24 via the head-side communication paths 67 inside the head-side cushion shafts 63 and the head-side restricting flow paths 68, and air in the rod-side pressure chambers 62 of the air cylinders 7A and 7B is discharged from the rod-side port 22 via the rod-side main flow paths 25 from the rod-side cushion holes 78 (the rod-side communication paths) and the rod-side restricting flow paths 80.

In order to move the valve plate 3 from this state to the hermetically sealed position P3 in FIGS. 5 and 6, when the head-side port 21 is set in the air discharge state and the rod-side port 22 is set in the air supply state, air from the rod-side port 22 is caused to flow into the rod-side cushion holes 78 via the rod-side main flow paths 25, after which the rod-side cushion packings 86 are pushed open to cause the air to flow into the rod-side pressure chambers 62 in a freely flowing state; and air in the head-side pressure chambers 61 is discharged in a freely flowing state from the head-side port 21 via the head-side main flow paths 24 from the head-side communication paths 67 in the head-side cushion shafts 63, so that the pistons 23 move upward without their speeds being reduced.

At this time, although the air from the rod-side cushion holes 78 also flows into the rod-side pressure chambers 62 via the rod-side restricting flow paths 80, this amount is very small. Although the air in the head-side pressure chambers 61 is also discharged to the head-side main flow paths 24 via the head-side restricting flow paths 68, this amount is very small.

When the pistons 23 move upward, the valve plate 3 moves up to the hermetically sealed position P3 shown in FIGS. 5 and 6 via the intermediate position P2 shown in FIGS. 3 and 4. FIG. 10 shows an operation state of each air cylinder 7 after the valve plate 3 has reached the intermediate position P2. The position of each piston 23 at this time is a position where each piston 23 has passed the intermediate point of the ascending stroke and has approached the ascending stroke end. The head-side cushion shafts 63 at this time are already fitted in the head-side cushion holes 74. The rod-side cushion shafts 85 are in a completely moved out state from the rod-side cushion holes 78. Therefore, the connection between the head-side pressure chambers 61 and the head-side communication paths 67 is stopped, so that the air inside the head-side pressure chambers 61 is discharged with the flow rate being limited via the head-side restricting flow paths 68.

At the intermediate position P2, although, as described above, the second block 12 of the shaft driving mechanism 9 comes into contact with the air dampers 36 and stops. At this time, since the air from the rod-side port 22 is supplied to the air dampers 36 via the rod-side main flow paths 25, an air-cushioning action occurs, so that shock is absorbed when the second block 12 collides with the air dampers 36.

When, immediately before the valve plate 3, that is, the pistons 23 reach the intermediate position P2, the air in each head-side pressure chamber 61 is discharged with its flow rate being limited, the air-cushioning effect causes the speed of each piston 23 to be reduced and each piston 23 to subsequently move upward up to the hermetically sealed position P3 shown in FIG. 11 at a low speed. At the hermetically sealed position P3, the pistons 23 come into contact with the end walls of the head-side pressure chambers 61, that is, the lower surface of the hood 6 with shock being absorbed, and stop. This position corresponds to the ascending stroke end of each piston 23. At this time, since the pistons 23 are in contact with the chamber walls with their speed being reduced, for example, collision noise and vibration caused by the contact are suppressed from occurring.

When the valve plate 3 is moved towards the fully opened position P1 from the hermetically sealed position P3, the head-side port 21 is set in the air supply state, and the rod-side port 22 is set in the air discharge state. At this time, air from the head-side port 21 flows into the head-side cushion holes 74 from the head-side main flow paths 24 via the head-side communication paths 67 in the head-side cushion shafts 63, after which the head-side cushion packings 75 are pushed open to cause the air to flow into the head-side pressure chambers 61 in a freely flowing state; and air in the rod-side pressure chambers 62 is discharged in a freely flowing state from the rod-side port 22 via the rod-side main flow paths 25 from the rod-side cushion holes 78, so that the pistons 23 move downward without their speeds being reduced.

Then, when, after the pistons 23 have moved further downward via the intermediate position P2 in FIG. 10, and have passed the intermediate point of the descending stroke, the rod-side cushion shafts 85 are fitted in the rod-side cushion holes 78, the connection between the rod-side pressure chambers 62 and the rod-side cushion holes 78 is stopped. Therefore, the air in the rod-side pressure chambers 62 is discharged via the rod-side restricting flow paths 80 with its flow rate being limited. Therefore, the air-cushioning effect causes the speed of each piston 23 to be reduced and each piston 23 to subsequently move downward up to the fully opened position P1 shown in FIG. 8 at a low speed. At the fully opened position P1, the pistons 23 come into contact with the end walls of the rod-side pressure chambers 62, that is, upper surfaces of the collars 53 with shock being absorbed, and stop. This position corresponds to the descending stroke end of each piston 23. At this time, since the pistons 23 are in contact with the collars 53 with the speed being reduced, for example, collision noise and vibration caused by the contact are suppressed from occurring.

In this way, since, in the gate valve, the air cylinders 7A and 7B each include the head-side air cushion mechanism and the rod-side air cushion mechanism, by reducing the speed of the pistons 23 by an air-cushioning effect when the pistons 23 have approached the ascending stroke end and the descending stroke end, the pistons 23 are stopped with shock being absorbed at both the ascending stroke end and the descending stroke end. Therefore, when the valve plate 3 is to open and close the gate opening 2, shock that is produced when the pistons 23 collide with the head-side pressure chambers 61 and the rod-side pressure chambers 62 is reduced, so that noise produced by the shock is suppressed from occurring.

The speed-reduction operations by the air cushion mechanisms at the ascending stroke end and the descending stroke end of the pistons 23 are performed in synchronism at both of the pair of air cylinders 7A and 7B.

Figure 15:
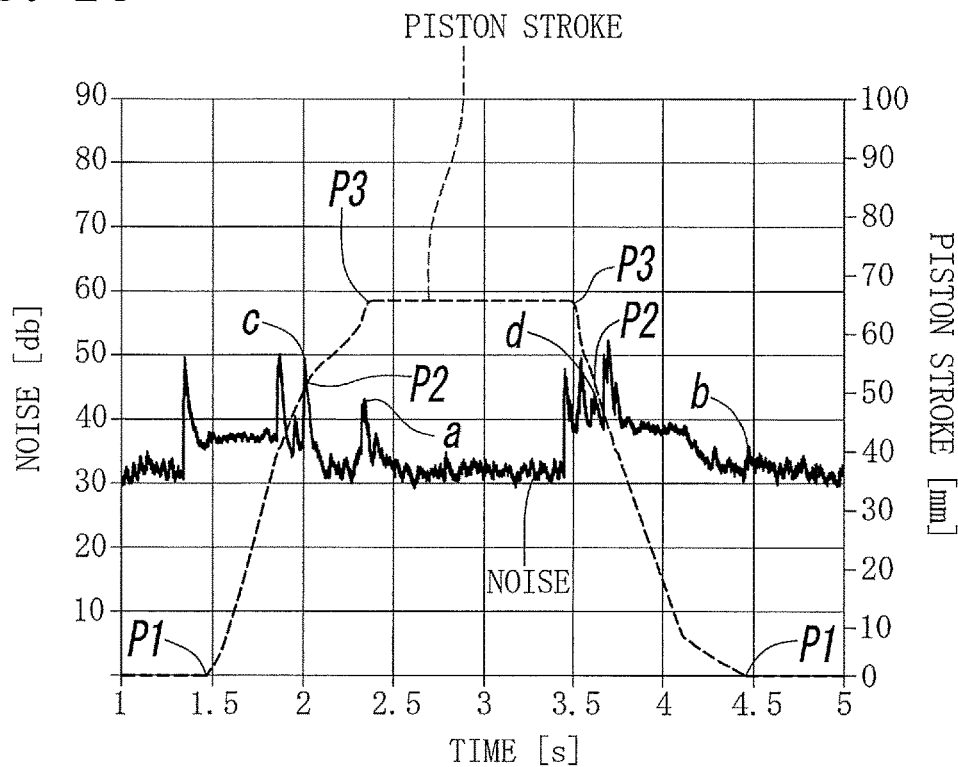
FIG. 15 is a diagram showing the relationships of noise that is produced when an opening/closing operation of the valve plate is performed with a stroke when each piston advances and with a stroke when each piston retreats in the gate valve according to the present invention.

FIG. 15 is a diagram showing the relationships between the stroke of each piston 23 and noise in the gate valve of the embodiment. This figure is a diagram showing the results of measurements of noise that is produced due to a piston stroke when after a certain time has passed after each piston 23 has moved upward to the hermetically sealed position P3, which is the ascending (retreat) stroke end, via the intermediate position P2 from the fully opened position P1, which is the descending (advance) stroke end, each piston 23 moves downward up to the fully opened position P1, which is the descending stroke end, via the intermediate position P2 from the hermetically sealed position P3.

Figure 16:
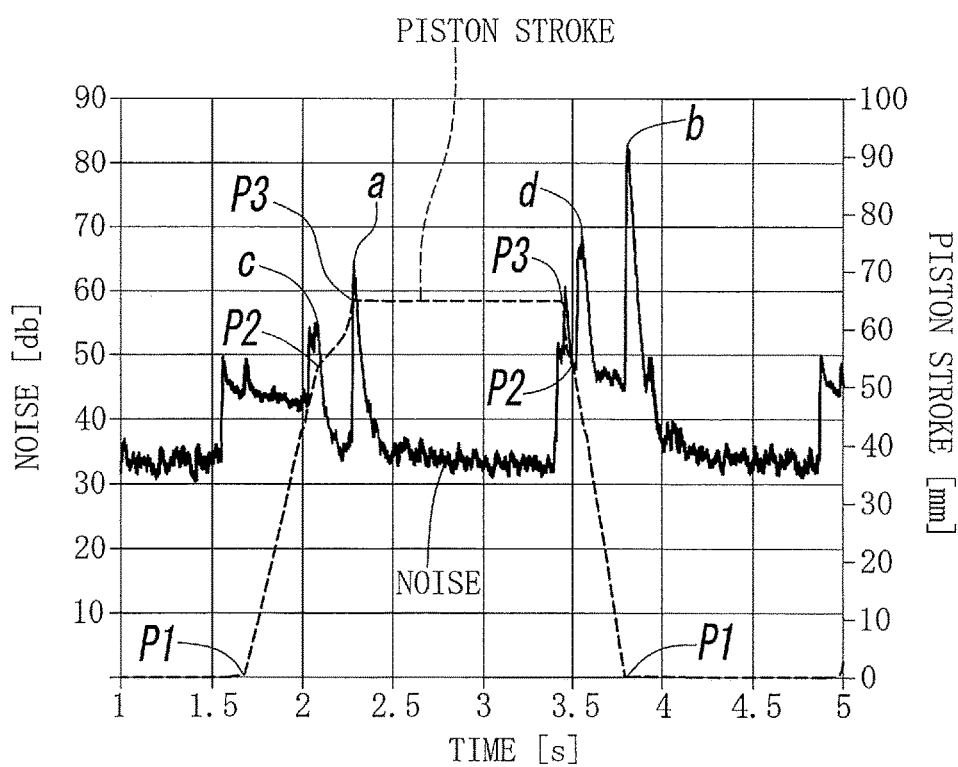
FIG. 16 is a diagram showing the relationships of noise that is produced when an opening/closing operation of a valve plate is performed with a stroke when each piston advances and with a stroke when each piston retreats in a publicly known gate valve.

As a comparative example, FIG. 16 is a diagram showing the relationships between piston strokes and noise of a publicly known valve not including air cushion mechanisms. In the comparative example, a collision noise a produced when the pistons have collided with the end walls of the head-side pressure chambers at the ascending stroke end (the hermetically sealed position P3) and a collision noise b produced when the pistons have collided with the end walls of the rod-side pressure chambers at the descending stroke end (the fully opened position P1) are very large, whereas, in FIG. 15, the collision noise a and the collision noise b are considerably reduced.

Regarding a noise c that is presumed to be caused by, for example, a collision noise produced when the second block 12 of the shaft supporting mechanism 9 has collided with the hood 6 and a collision noise produced when the cam rollers 51a and 51b move into the cam grooves 50a and 50b near the intermediate position P2 during the ascending stroke of each piston 23, and regarding a noise d that is presumed to be caused by a contact noise produced when the cam rollers 51a and 51b move into the cam grooves 50a and 50b near the intermediate position P2 during the descending stroke of each piston 23, the noises are very large in the comparative example of FIG. 16, whereas it can be understood that the noises are considerably reduced in FIG. 15.

As schematically shown in FIGS. 7, 8, 10, and 11, a first lock mechanism 91 for locking the valve plate 3 at the fully opened position P1 and a second lock mechanism 92 for locking the valve plate 3 at the hermetically sealed position P3 are provided at the cylinder housing 20 of each of the pair of air cylinders 7A and 7B in the gate valve. These first lock mechanisms 91 and the second lock mechanisms 92 are disposed on the roller frames 20a of the cylinder housings 20 so as to be vertically adjacent to each other along the axial line L2. The first lock mechanisms 91 are disposed above the second lock mechanisms 92, that is, closer to the hood 6.

Figure 13:
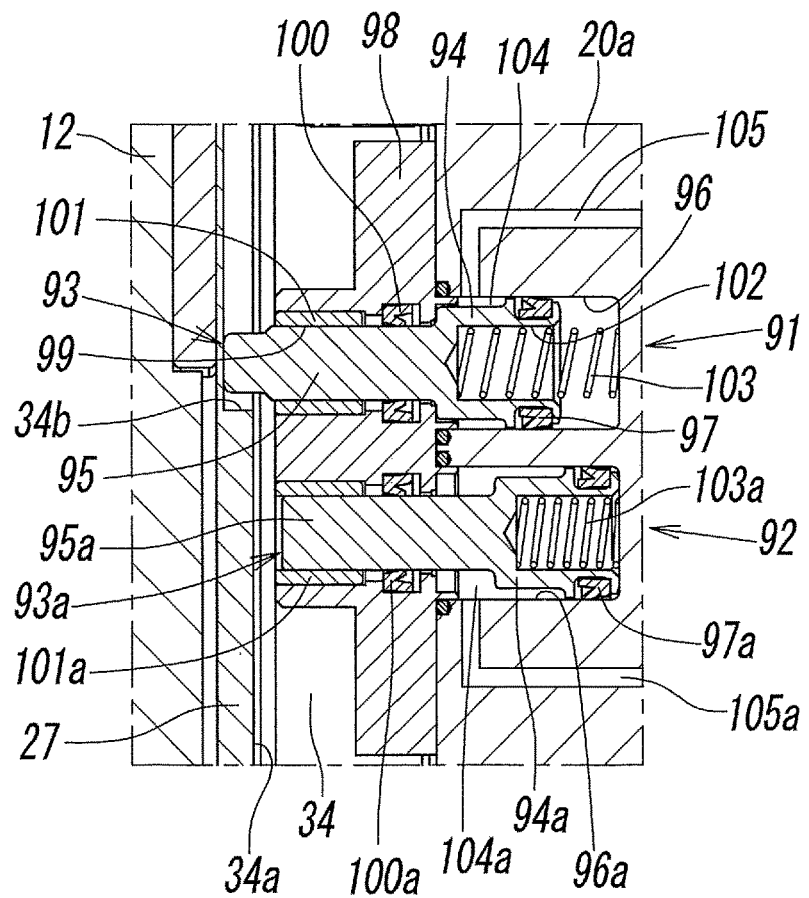
FIG. 13 is an enlarged sectional view along line XIII-XIII in FIG. 2.
Figure 14:
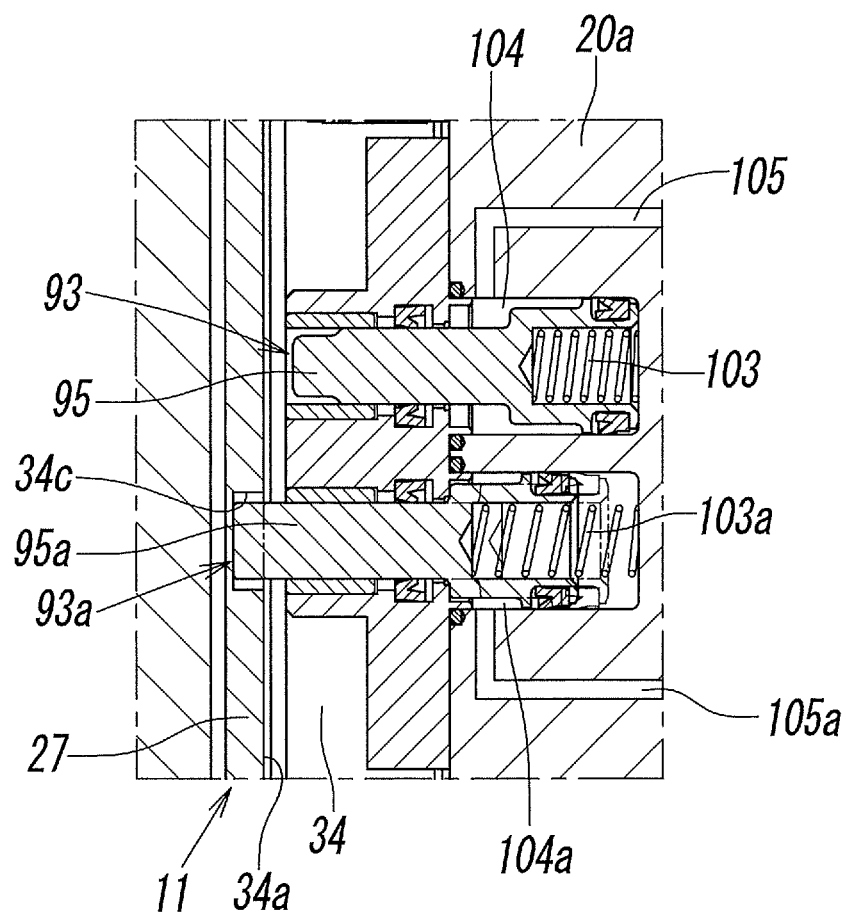
FIG. 14 is an enlarged sectional view along line XIV-XIV in FIG. 6.

As shown in FIGS. 13 and 14, each first lock mechanism 91 includes a lock piston 93 on the roller frame 20a, the lock piston 93 being supported so as to advance and retreat freely with respect to the cam frame 27. Each lock piston 93 includes a proximal-end-side piston 94 and a distal-end-side engaging shaft portion 95. Each piston portion 94 is slidably accommodated via a piston seal 97 inside a piston chamber 96 formed in the roller frame 20a, and each engaging shaft portion 95 exists in a guide hole 99 of a lock cover 98 fixed to the roller frame 20a so as to advance and retreat freely via a shaft-portion seal 100 and a bush 101. The diameter of each engaging shaft portion 95 is smaller than the diameter of each piston portion 94, and a distal end of each engaging shaft portion 95 has a diameter that is smaller than a portion that is guided by the shaft-portion seal 100 and the bush 101.

Lock springs 103 are interposed between concave portions 102 that are formed in end surfaces of the piston portions 94 and bottom walls of the piston chambers 96, and the lock pistons 93 are normally urged by the lock springs 103 in a direction in which the distal ends of the engaging shaft portions 95 protrude from the guide holes 99.

Unlock pressure chambers 104 are formed between the piston seals 97 and the shaft-portion seals 100, and the unlock pressure chambers 104 communicate with the rod-side main flow paths 25 via unlock communication paths 105. Specifically, as shown in FIGS. 7 and 10, the unlock pressure chamber 104 of the first lock mechanism 91 that is provided at the first air cylinder 7A communicates with the third portion 25c of the rod-side main flow path 25 via the unlock communication path 105, and, as shown in FIG. 7, the unlock pressure chamber 104 of the first lock mechanism 91 provided at the second air cylinder 7B communicates with the fifth portion 25e of the rod-side main flow path 25 via the unlock communication path 105.

On the other hand, the second lock mechanisms 92 have a structure that is essentially the same as the first lock mechanisms 91 excluding a part of the structure. Therefore, each element making up the second lock mechanisms 92 is denoted by a reference sign in which an "a" is added to the reference sign of each element making up the first lock mechanisms 91, and is not described in detail.

A first point of difference of the second lock mechanisms 92 from the first lock mechanisms 91 is that unlock pressure chambers 104a of the second lock mechanisms 92 communicate with the head-side main flow paths 24 via unlock communication paths 105a. When described specifically, as shown in FIGS. 7 and 10, the unlock pressure chamber 104a of the second lock mechanism 92 provided at the first air cylinder 7A communicates with the second portion 24b of the head-side main flow path 24 via the unlock communication path 105a, and, as shown in FIG. 7, the unlock pressure chamber 104a of the second lock mechanism 92 provided at the second air cylinder 7B communicates via the unlock communication path 105a with a fourth portion 24d branching from the third portion 24c of the head-side main flow path 24 and extending in the direction of the axial line L2 inside the side wall of the cylinder housing 20 of the second air cylinder 7B.

A second point of difference of the second lock mechanisms 92 from the first lock mechanism 91 is that the diameters of distal ends of engaging shaft portions 95a of lock pistons 93a are not reduced.

Next, the operations of the first lock mechanisms 91 and the second lock mechanisms 92 are described.

As shown in FIGS. 1, 2, and 7, when the valve plate 3 is at the fully opened position P1, that is, when the pistons 23 and the driving rods 8 at the air cylinders 7A and 7B are at a descending end, the head-side port 21 is in the air supply state and the rod-side port 22 is in the air discharge state. Therefore, since the unlock pressure chambers 104 of the first lock mechanisms 91 communicate with the rod-side port 22, they are in the air discharge state, and since the unlock pressure chambers 104a of the second lock mechanisms 92 communicate with the head-side port 21, they are in the air supply state.

Therefore, as shown in FIG. 13, the lock pistons 93 of the first lock mechanisms 91 are pushed by the lock springs 103 and advance to lock positions, so that the distal ends of the engaging shaft portions 95 engage with engaging portions 34b formed at upper end portions of the guide grooves 34 of the cam frames 27. As a result, the cam frames 27, that is, the first block 11 is in an engaged state with the roller frames 20a of the cylinder housings 20 and is prevented from moving upward, so that the valve plate 3 is locked at the fully opened position P1.

On the other hand, the lock pistons 93a of the second lock mechanisms 92 compress the lock springs 103a and retreat due to the action of air, and occupy unlock positions.

When, in order to move the valve plate 3 to the hermetically sealed position P3 of FIGS. 5 and 6 from this state, the head-side port 21 is set in the air discharge state and the rod-side port 22 is set in the air supply state, the unlock pressure chambers 104 of the first lock mechanisms 91 are in the air supply state and the unlock pressure chambers 104a of the second lock mechanisms 92 are in the air discharge state.

Therefore, as shown by the solid line in FIG. 14, the lock pistons 93 of the first lock mechanisms 91 retreat while compressing the lock springs 103 due to the action of air, and occupy unlock positions that are apart from the engaging portions 34b, so that the cam frames 27, that is, the first block 11 can move upward.

On the other hand, as shown by the broken chain line in FIG. 14, the lock pistons 93a of the second lock mechanisms 92 are pushed by the lock springs 103a and advance, so that the distal ends of the engaging shaft portions 95a are in contact with flat bottom walls 34a of the guide grooves 34 of the cam frames 27 so as to be movable relatively in an up-down direction along the guide grooves 34. At this time, the distal ends of the engaging shaft portions 95a do not engage with the cam frames 27.

Due to the action of the air cylinders 7A and 7B, the valve plate 3 moves upward up to the hermetically sealed position P3, and, as shown in FIG. 14, when engaging holes 34c formed in the bottom walls of the guide grooves 34 move upward up to the positions of the lock pistons 93a, the lock pistons 93a are pushed by the lock springs 103a and advance, and the distal ends of the engaging shaft portions 95a are fitted to and engaged with the insides of the engaging holes 34c. Therefore, the lock pistons 93a occupy the lock positions. As a result, the cam frames 27, that is, the first block 11 is in an engaged state with the roller frames 20a of the cylinder housings 20 and is prevented from moving downward, so that the valve plate 3 is locked at the hermetically sealed position P3.

When the valve plate 3 is to be moved to the fully opened position P1 from the hermetically sealed position P3, as described above, the head-side port 21 and the unlock pressure chambers 104a of the second lock mechanisms 92 are in the air supply state, and the rod-side port 22 and the unlock pressure chambers 104 of the first lock mechanisms 91 are in the air discharge state.

Therefore, the lock pistons 93a of the second lock mechanisms 92 retreat while compressing the lock springs 103a due to the action of air, and occupy unlock positions where they have moved out from the engaging holes 34c, so that the first block 11 can move downward.

On the other hand, the lock pistons 93 of the first lock mechanisms 91 advance due to an urging force of the lock springs 103, and the distal ends of the engaging shaft portions 95 are in contact with the flat bottom walls 34a of the guide grooves 34 of the cam frames 27 so as to be movable relatively in an up-down direction along the guide grooves 34. At this time, the distal ends of the engaging shaft portions 95a do not engage with the cam frames 27.

When, due to the action of the air cylinders 7A and 7B, the valve plate 3 moves downward up to the fully opened position P1 and the engaging portions 34b at the upper ends of the guide grooves 34 of the cam frames 27 move downward up to the positions of the lock pistons 93 of the first lock mechanisms 91, as shown in FIG. 13, the lock pins 93 are pushed by the lock springs 103 and advance, and the distal ends of the engaging shaft portions 95 engage with the engaging portions 34b, so that the valve plate 3 is locked at the fully opened position P1.

Thus, since the first lock mechanisms 91 and the second lock mechanisms 92 are provided at the pair of air cylinders 7A and 7B and the valve plate 3 is locked at the fully opened position P1 and the hermetically sealed position P3 by the first lock mechanisms 91 and the second lock mechanisms 92, even if the pressure of air that is supplied to the air cylinders 7A and 7B varies or the supply of air to the air cylinders 7A and 7B is blocked, it is possible to prevent, for example, unexpected displacement of the valve plate 3 from occurring and to excel in stability.

REFERENCE SIGNS LIST 2 gate opening
3 valve plate
4 valve shaft
5 driving mechanism
6 hood
7A, 7B air cylinder
8 driving rod
9 shaft supporting mechanism
20 cylinder housing
21 head-side port
22 rod-side port
23 piston
24 head-side main flow path
25 rod-side main flow path
36 air damper
40 damper chamber
41 cushion member
44 damper rod
46 damper pressure chamber
61 head-side pressure chamber
62 rod-side pressure chamber
63 head-side cushion shaft
67 head-side communication path
68 head-side restricting flow path
74 head-side cushion hole
75 head-side cushion packing
78 rod-side cushion hole (rod-side communication path)
80 rod-side restricting flow path
85 rod-side cushion shaft
86 rod-side cushion packing
91 first lock mechanism
92 second lock mechanism
P1 fully opened position
P2 intermediate position
P3 hermetically sealed position

The invention claimed is:

1. A low noise gate valve comprising:

a valve plate that opens and closes a gate opening, a valve shaft whose distal end is connected to the valve plate, and a driving mechanism that causes the valve plate to perform an opening/closing operation via the valve shaft, wherein the driving mechanism includes a hood through which the valve shaft displaceably extends, a pair of left and right air cylinders that are mounted on the hood parallel to each other with the valve shaft interposed therebetween, and a head-side port and a rod-side port that allow air to be supplied to and discharged from the pair of air cylinders, wherein each air cylinder includes a cylinder housing that is fixed to the hood, a piston that is accommodated in the cylinder housing so as to advance and retreat freely, a driving rod whose proximal end is connected to the piston and whose distal end protrudes out from the cylinder housing, and a head-side pressure chamber and a rod-side pressure chamber that are formed on one end side and the other end side of the piston, respectively, wherein the head-side pressure chambers communicate with the head-side port via head-side main flow paths formed at the cylinder housings and the hood, and the rod-side pressure chambers communicate with the rod-side port via rod-side main flow paths formed at the cylinder housings and the hood, wherein a proximal end portion of the valve shaft is supported by the driving rods of the pair of air cylinders via a shaft supporting mechanism, the valve plate moves from a hermetically sealed position, where the valve plate hermetically seals the gate opening to a fully opened position where the gate opening is fully opened via an intermediate position, where the valve plate does not close the gate opening though the valve plate faces the gate opening, due to an advance stroke of the pistons and the driving rods, and the valve plate moves from the fully closed position to the hermetically sealed position via the intermediate position due to a retreat stroke of the pistons and the driving rods, wherein each air cylinder includes a head-side air cushion mechanism and a rod-side air cushion mechanism that reduce shock when the gate opening is opened and closed by the valve plate, wherein each head-side air cushion mechanism includes a head-side communication path and a head-side restricting flow path that are arranged and parallel and that connect the head-side pressure chamber and the head-side main flow path, and a blocking mechanism that blocks the head-side communication path when the piston that retreats has approached a retreat stroke end, the blocking mechanism blocks the head-side communication path before the valve plate reaches the intermediate position in the retreat stroke of the pistons, and wherein each rod-side air cushion mechanism includes a rod-side communication path and a rod-side restricting flow path that are arranged and parallel and that connect the rod-side pressure chamber and the rod-side main flow path, and a blocking mechanism that blocks the rod-side communication path when the piston that advances has approached an advance stroke end, the blocking mechanism of each rod-side air cushion mechanism blocks the rod-side communication path after the valve plate has passed the intermediate position in the advance stroke of the pistons, wherein the hood is provided with an air damper with which the shaft supporting mechanism comes into contact with shock being absorbed when the valve plate has reached the intermediate position from the fully opened position, and wherein the air damper includes a damper chamber that is formed at the hood, a damper rod that is accommodated in the damper chamber so as to be slidable with a distal end protruding out from the hood, and a damper pressure chamber that is formed to communicate with the rod-side main flow paths to absorb shock.

2. The gate valve according to claim 1, wherein the blocking mechanism of each head-side air cushion mechanism includes a head-side cushion shaft that protrudes into the head-side pressure chamber from an end wall of the head-side pressure chamber, a concave-shaped head-side cushion hole that is formed in the piston so that the head-side cushion shaft is fitted thereto when the piston has approached the retreat stroke end, and a head-side cushion packing that seals a portion between an inner periphery of the head-side cushion hole and an outer periphery of the head-side cushion shaft, and the head-side communication path is formed in the head-side cushion shaft, and wherein the blocking mechanism of each rod-side air cushion mechanism includes a concave-shaped rod-side cushion hole that is formed in an end wall of the rod-side pressure chamber, a rod-side cushion shaft that is fitted in the rod-side cushion hole when the piston has approached the advance stroke end, and a rod-side cushion packing that seals a portion between an inner periphery of the rod-side cushion hole and an outer periphery of the rod-side cushion shaft, and the rod-side communication path is formed from the rod-side cushion hole.

3. The gate valve according to claim 2, wherein each head-side cushion packing is formed so as to block a flow of air flowing towards the head-side cushion hole from the head-side pressure chamber and allow a flow of air flowing towards the head-side pressure chamber from the head-side cushion hole, and wherein each rod-side cushion packing is formed so as to block a flow of air flowing towards the rod-side cushion hole from the rod-side pressure chamber and allow a flow of air flowing towards the rod-side pressure chamber from the rod-side cushion hole.

4. The gate valve according to claim 1, wherein all of the head-side communication paths and the head-side restricting flow paths of the head-side air cushion mechanisms of the pair of air cylinders communicate with the head-side main flow paths, and all of the rod-side communication paths and the rod-side restricting flow paths of the rod-side air cushion mechanisms of the pair of air cylinders communicate with the rod-side main flow paths, so that the head-side air cushion mechanisms and the rod-side air cushion mechanisms of the pair of air cylinders operate in synchronism with each other.

5. The gate valve according to claim 1, wherein the blocking mechanism of each head-side air cushion mechanism blocks the head-side communication path after the piston passes an intermediate point of the retreat stroke and before the valve plate reaches the intermediate position.

6. The gate valve according to claim 1, wherein each air cylinder is provided with a first lock mechanism for locking the valve plate at the fully opened position and a second lock mechanism for locking the valve plate at the hermetically sealed position.

* * * * *